United States Patent
Makino et al.

(10) Patent No.: US 11,444,315 B2
(45) Date of Patent: *Sep. 13, 2022

(54) SOLID ELECTROLYTE COMPOSITION, SHEET FOR ALL-SOLID STATE SECONDARY BATTERY, ALL-SOLID STATE SECONDARY BATTERY, AND METHODS FOR MANUFACTURING SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Masaomi Makino, Kanagawa (JP);
Hiroaki Mochizuki, Kanagawa (JP);
Toshihiko Yawata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 16/255,948

(22) Filed: Jan. 24, 2019

(65) Prior Publication Data

US 2019/0157711 A1    May 23, 2019

Related U.S. Application Data

(63) Continuation of application No. PCT/JP2017/027342, filed on Jul. 27, 2017.

(30) Foreign Application Priority Data

Jul. 28, 2016 (JP) .............................. JP2016-148860

(51) Int. Cl.
*H01M 10/056* (2010.01)
*H01M 10/0585* (2010.01)
(Continued)

(52) U.S. Cl.
CPC ............ *H01M 10/056* (2013.01); *H01B 1/06* (2013.01); *H01M 10/052* (2013.01);
(Continued)

(58) Field of Classification Search
CPC ............ H01M 10/056; H01M 10/0585; H01M 50/446
See application file for complete search history.

(56) References Cited

U.S. PATENT DOCUMENTS

| 2012/0315547 A1 | 12/2012 | Itoh et al. |
| 2014/0120427 A1 | 5/2014 | Suyama et al. |
| 2016/0336613 A1 | 11/2016 | Mochizuki et al. |

FOREIGN PATENT DOCUMENTS

| CN | 103608871 A | 2/2014 |
| JP | 2002-226513 A | 8/2002 |

(Continued)

OTHER PUBLICATIONS

Mitsui et al. JP 2014-043487A. Mar. 13, 2014. English machine translation by EPO. (Year: 2014).*

(Continued)

*Primary Examiner* — James Lee
(74) *Attorney, Agent, or Firm* — Sughrue Mion, PLLC

(57) ABSTRACT

Provided are a solid electrolyte composition including a sulfide-based inorganic solid electrolyte, a salt of a metal belonging to Group I or II of the periodic table, and a multibranched polymer, in which the multibranched polymer has a core portion and at least three arm portions that bond to the core portion, and the arm portion dissolves a metal ion of the salt of the metal belonging to Group I or II of the periodic table, a sheet for an all-solid state secondary battery, an all-solid state secondary battery, and methods for manufacturing a sheet for an all-solid state secondary battery and an all-solid state secondary battery.

15 Claims, 1 Drawing Sheet

(51) Int. Cl.
    *H01M 10/052*     (2010.01)
    *H01B 1/06*       (2006.01)
    *H01M 10/0562*    (2010.01)

(52) U.S. Cl.
    CPC ... *H01M 10/0562* (2013.01); *H01M 10/0585* (2013.01); *H01M 2300/0068* (2013.01); *H01M 2300/0082* (2013.01); *H01M 2300/0091* (2013.01); *Y02E 60/10* (2013.01); *Y02T 10/70* (2013.01)

(56) References Cited

FOREIGN PATENT DOCUMENTS

| | | | |
|---|---|---|---|
| JP | 2009-176484 A | | 8/2009 |
| JP | 2012-224509 A | | 11/2012 |
| JP | 2014043487 A | * | 3/2014 |
| JP | 2015164125 A | | 9/2015 |
| WO | 2011/099497 A1 | | 8/2011 |
| WO | 2015/115561 A1 | | 8/2015 |

OTHER PUBLICATIONS

Yanagi et al. JP 2009176484A. Aug. 6, 2009. English machine translation by EPO. (Year: 2009).*
Rensl E. A. Dillon et al., "Ion Transport and Vibrational Spectra of Branched Polymer and Dendrimer Electrolytes", Chem. Mater., 2001, pp. 1369-1373, vol. 13.
International Search Report of PCT/JP2017/027342 dated Sep. 5, 2017 [PCT/ISA/210].
Written Opinion of PCT/JP2017/027342 dated Sep. 5, 2017 [PCT/ISA/237].
International Preliminary Report on Patentability and Translation of Written Opinion, dated Jan. 29, 2019 from the International Bureau in counterpart International application No. PCT/JP2017/027342.
Communication dated Jul. 15, 2020, from the European Patent Office in European Application No. 17834505.4.
Communication dated Mar. 28, 2019 from the European Patent Office in application No. 17834505.4.
Office Action dated May 11, 2021 issued by the Chinese Patent Office in Chinese Application No. 201780045347.X.

* cited by examiner

US 11,444,315 B2

SOLID ELECTROLYTE COMPOSITION, SHEET FOR ALL-SOLID STATE SECONDARY BATTERY, ALL-SOLID STATE SECONDARY BATTERY, AND METHODS FOR MANUFACTURING SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2017/027342 filed on Jul. 27, 2017, which claims priority under 35 U.S.C. § 119 (a) to Japanese Patent Application No. 2016-148860 filed in Japan on Jul. 28, 2016. Each of the above applications is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an all-solid state secondary battery, and methods for manufacturing a sheet for an all-solid state secondary battery and an all-solid state secondary battery.

2. Description of the Related Art

A lithium ion secondary battery is a storage battery which has a negative electrode, a positive electrode and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under such circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety and reliability which are considered as a problem of batteries in which the organic electrolytic solution is used can be significantly improved, and it also becomes possible to extend service lives. Furthermore, all-solid state secondary batteries can be provided with a structure in which the electrodes and the electrolyte are directly disposed in series. Therefore, it becomes possible to increase the energy density to be higher than that of secondary batteries in which the organic electrolytic solution is used, and the application to electric vehicles, large-sized storage batteries, and the like is anticipated.

Due to the respective advantages described above, development of all-solid state secondary batteries is underway as next-generation lithium ion batteries. For example, JP2015-164125A discloses an all-solid state secondary battery in which at least any of a positive electrode active material layer, a negative electrode active material layer, or an inorganic solid electrolyte layer is a layer constituted of a solid electrolyte composition including an inorganic solid electrolyte and a multibranched polymer. This all-solid state secondary battery is excellent in terms of the ion conductivity. In addition, JP2009-176484A discloses an all-solid state lithium secondary battery in which a resin having an ethylene oxide skeleton or a thermoplastic elastomer is used as a binding agent. This all-solid state lithium secondary battery is excellent in terms of the electrochemical capacity and the charge and discharge capability.

SUMMARY OF THE INVENTION

In recent years, the development of all-solid state secondary batteries has been rapidly progressing. Accordingly, there has been a demand for an all-solid state secondary battery which does not only have performance demanded for all-solid state secondary batteries of the related art but also exhibits excellent performance even in the case of being used in a severer environment. That is, there has been a demand for an all-solid state secondary battery which has a high discharge capacity retention, has a discharge capacity a decrease of which is suppressed even after the storage for a certain period of time from the manufacturing, and does not easily cause abnormality even in the case of being charged and discharged in a severer environment.

In consideration of the above-described circumstance, an object of the present invention is to provide a solid electrolyte composition capable of realizing an all-solid state secondary battery which has a high discharge capacity retention, has a discharge capacity a decrease of which is suppressed even after the storage for a certain period of time from the manufacturing, and, additionally, does not easily cause abnormality even in the case of being used in an environment that is severer than ever by being used as a layer-constituting material of the all-solid state secondary battery. In addition, another object of the present invention is to provide a sheet for an all-solid state secondary battery and an all-solid state secondary battery which are produced using the solid electrolyte composition as a layer-constituting material. Furthermore, still another object of the present invention is to provide methods for manufacturing the sheet for an all-solid state secondary battery and the all-solid state secondary battery respectively.

As a result of intensive studies, the present inventors found that the use of a solid electrolyte composition which contains a specific sulfide-based inorganic solid electrolyte, a salt of a metal belonging to Group I or II of the periodic table, and a multibranched polymer having a specific structure and in which an arm portion of the multibranched polymer dissolves a metal ion of the salt of the metal enables the realization of an all-solid state secondary battery which has a high discharge capacity retention, has a discharge capacity a decrease of which is suppressed even after the storage for a certain period of time from the manufacturing, and does not easily cause abnormality even in the case of being used in an environment that is severer than ever. The present invention was completed by repeating additional studies on the basis of the above-described finding.

That is, the above-described objects are achieved by the following means.

<1> A solid electrolyte composition comprising: a sulfide-based inorganic solid electrolyte having a conductivity of an ion of a metal belonging to Group I or II of the periodic table; a salt of a metal belonging to Group I or II of the periodic table; and a multibranched polymer, in which the multibranched polymer has a core portion and at least three arm portions that bond to the core portion, and the arm portion dissolves a metal ion of the salt of the metal belonging to Group I or II of the periodic table.

<2> The solid electrolyte composition according to <1>, in which the arm portion includes a polymer structure containing at least one repeating unit having an alkylene oxide group, a carbonate group, an ester group, an amide group, or a silicone group.

<3> The solid electrolyte composition according to <2>, in which the repeating unit is a repeating unit represented by Formula (A).

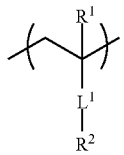

Formula (A)

In the formula, $R^1$ represents a hydrogen atom, a halogen atom, a cyano group, an alkyl group, an alkoxy group, or an aryl group. $R^2$ represents a hydrogen atom, a halogen atom, a cyano group, an alkyl group, an alkoxy group, or an aryl group. $L^1$ represents a divalent linking group including at least one of an alkylene oxide group, a carbonate group, an ester group, an amide group, or a silicone group.

<4> The solid electrolyte composition according to <1> or <2>, in which a main chain of the polymer structure constituting the arm portion is constituted by including an alkylene oxide group, a carbonate group, and/or an ester group.

<5> The solid electrolyte composition according to any one of <1> to <4>, in which a mass-average molecular weight of the arm portion is 500 or more and 1,000,000 or less.

<6> The solid electrolyte composition according to any one of <1> to <5>, in which the multibranched polymer is represented by Formula (B).

L—(X—P$^1$)$_n$    Formula (B)

In the formula, L represents an n-valent linking group. $P^1$ represents a polymer chain. n represents an integer of 3 or more. nP$^1$'s may be identical to or different from each other. L—(X)$_n$ forms the core portion, (P$^1$)$_n$ forms the arm portion. X represents an oxygen atom, a sulfur atom, or —N(R$^3$)—, and R$^3$ represents a hydrogen atom, an alkyl group, or an aryl group.

<7> The solid electrolyte composition according to any one of <1> to <6>, in which the core portion has a partial structure represented by any of the following formulae.

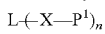 (B-1)

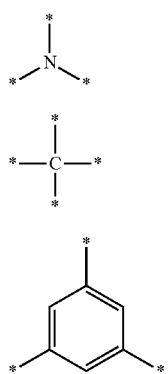

(B-2)

(B-3)

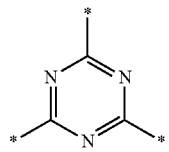 (B-4)

(B-5)

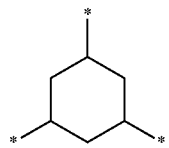 (B-6)

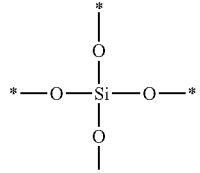 (B-7)

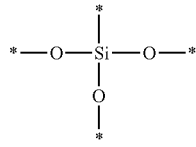 (B-8)

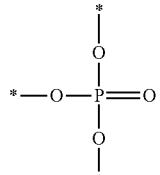 (B-9)

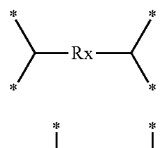 (B-10)

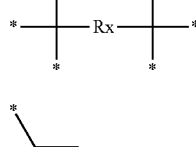 (B-11)

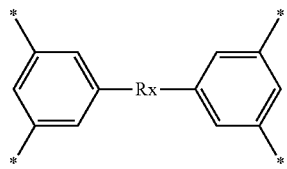 (B-12)

In the formulae, Rx represents a divalent substituent including an oxygen atom, a nitrogen atom, a sulfur atom, or a phosphorus atom. * represents a bonding site in the multibranched polymer.

<8> The solid electrolyte composition according to any one of <1> to <7>, in which the core portion is a group of atoms having a molecular weight of 200 or more.

<9> The solid electrolyte composition according to <7>, in which the core portion has a partial structure represented by any of the following formulae.

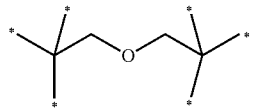
(B-13)

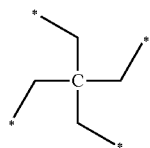
(B-14)

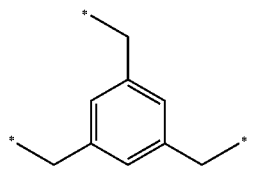
(B-15)

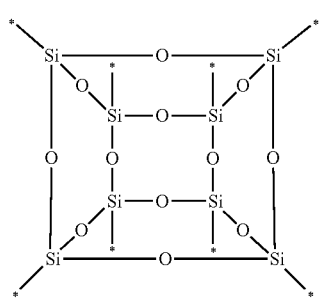
(B-16)

In the formulae, * represents a bonding site in the multibranched polymer.

<10> The solid electrolyte composition according to any one of <1> to <9>, in which a content of the salt of the metal belonging to Group I or II of the periodic table is 5% by mass to 60% by mass with respect to a total of 100% by mass of the multibranched polymer and the salt of the metal belonging to Group I or II of the periodic table.

<11> The solid electrolyte composition according to any one of <1> to <10>, in which the salt of the metal belonging to Group I or II of the periodic table is lithium bis(trifluoromethanesulfonyl)imide, lithium bis(fluorosulfonyl)imide and/or lithium bisoxalatoborate.

<12> The solid electrolyte composition according to any one of <1> to <11>, further comprising: an active material capable of intercalating and deintercalating an ion of a metal belonging to Group I or II of the periodic table.

<13> The solid electrolyte composition according to any one of <1> to <12>, in which a content of the multibranched polymer is 0.1 parts by mass or more and 10 parts by mass or less with respect to 100 parts by mass of the sulfide-based inorganic solid electrolyte having a conductivity of an ion of a metal belonging to Group I or II of the periodic table.

<14> A sheet for an all-solid state secondary battery comprising: a layer of the solid electrolyte composition according to any one of <1> to <13> on a base material.

<15> An all-solid state secondary battery comprising: a positive electrode active material layer; a negative electrode active material layer; and an inorganic solid electrolyte layer, in which at least one layer of the positive electrode active material layer, the negative electrode active material layer, or the inorganic solid electrolyte layer is a layer of the solid electrolyte composition according to any one of <1> to <13>.

<16> A method for manufacturing a sheet for an all-solid state secondary battery, the method comprising: a step of applying the solid electrolyte composition according to any one of <1> to <13> onto a base material.

<17> A method for manufacturing an all-solid state secondary battery, the method comprising: manufacturing an all-solid state secondary battery using the manufacturing method according to <16>.

In the present specification, the expression "the arm portion dissolves a metal ion of the salt of the metal belonging to Group I or II of the periodic table" means that the arm portion chemically interacts with the metal ion and thus brings the metal ion into the inside of the multibranched polymer. Therefore, it means that, even in a case in which the solid electrolyte composition of the embodiment of the invention contains the salt of the metal up to 20 times the multibranched polymer in terms of the mass, the salt of the metal is not precipitated during the formation of the respective layers constituting the all-solid state secondary battery.

In the present specification, numerical ranges expressed using "to" include numerical values before and after the "to" as the lower limit value and the upper limit value.

In the present specification, the expression "acrylic" broadly indicates a group of structures having an acryloyl group and indicates, for example, a structure having a substituent at an a site. However, a structure having a methyl group at the a site is expressed as "methacrylic", and, in some cases, the expression "(meth)acrylic" will be used in order to include the structure having a methyl group at the a site.

In the present specification, in a case in which there is a plurality of substituents, linking groups, and the like (hereinafter, referred to as substituents and the like) represented by a specific reference sign or a case in which a plurality of substituents and the like is simultaneously or selectively regulated, it means that the respective substituents and the like may be identical to or different from one another. What has been described above is also true for the regulation of the number of substituents and the like.

The above-described and other characteristics and advantages of the present invention will be further clarified by the following description with appropriate reference to the accompanying drawings.

The solid electrolyte composition of the embodiment of the invention is capable of realizing an all-solid state secondary battery which has a high discharge capacity retention, has a discharge capacity a decrease of which is suppressed even after the storage for a certain period of time from the manufacturing, and does not easily cause abnormality even in the case of being charged and discharged in an environment that is severer than that in the related art by being used as a layer-constituting material of the all-solid state secondary battery. The sheet for an all-solid state secondary battery produced using the solid electrolyte composition of the embodiment of the invention is capable of realizing an all-solid state secondary battery which has a high discharge capacity retention, has a discharge capacity a decrease of which is suppressed even after the storage for a certain period of time from the manufacturing, and does not easily cause abnormality even in the case of being charged and discharged in an environment that is severer than that in the related art by being used as a layer of the all-solid state secondary battery. The all-solid state secondary battery produced using the solid electrolyte composition of the embodiment of the invention as a layer-constituting material has a high discharge capacity retention, has a discharge capacity a decrease of which is suppressed even after the storage for a certain period of time from the manufacturing, and does not easily cause abnormality even in the case of being charged and discharged in an environment that is severer than that in the related art. In addition, according to the manufacturing methods of the embodiment of the invention, it is possible to manufacture the sheet for an all-solid state secondary battery and the all-solid state secondary battery of the embodiment of the invention.

DESCRIPTION OF THE PREFERRED EMBODIMENTS

<Preferred Embodiment>

Figure 1:
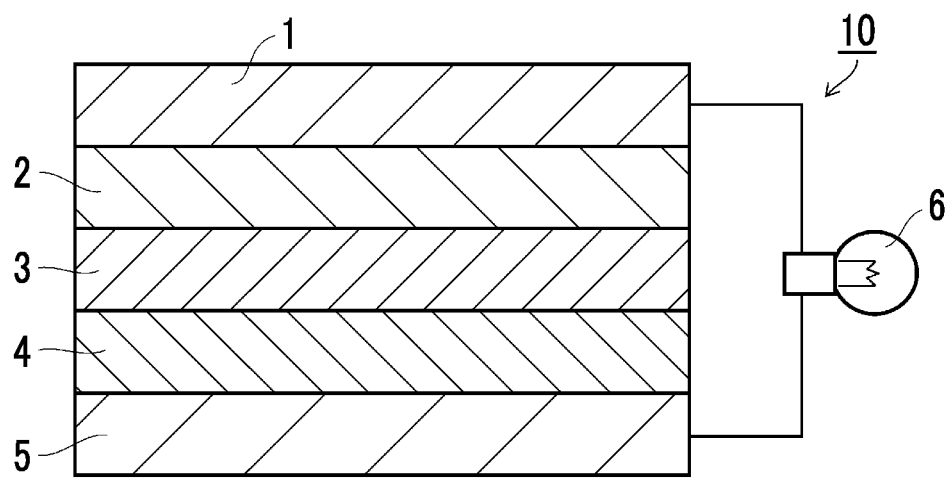
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons (e⁻) are supplied to the negative electrode side, and lithium ions (Li) are accumulated on the negative electrode side. On the other hand, during discharging, the lithium ions (LF) accumulated on the negative electrode side return to the positive electrode, and electrons are supplied to an operation portion 6. In an example illustrated in the drawing, an electric bulb is employed as the operation portion 6 and is lit by discharging. Hereinafter, there will be a case in which an all-solid state secondary battery having a layer constitution of FIG. 1 is also referred to as an all-solid state secondary battery sheet.

A solid electrolyte composition of the embodiment of the invention can be preferably used as a material used to form the negative electrode active material layer, the positive electrode active material layer, and the solid electrolyte layer. The solid electrolyte composition of the embodiment of the invention is particularly preferably used as a material used to shape the negative electrode active material layer and/or the solid electrolyte layer. In addition, a sheet for an all-solid state secondary battery of the embodiment of the invention is preferred as the negative electrode active material layer, the positive electrode active material layer, and the solid electrolyte layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the embodiment of the invention, the thickness of at least one layer of the positive electrode active material layer 4, the solid electrolyte layer 3, or the negative electrode active material layer 2 is still more preferably 50 μm or more and less than 500 μm.

<Solid Electrolyte Composition>

The solid electrolyte composition of the embodiment of the invention contains a sulfide-based inorganic solid electrolyte having a conductivity of an ion of a metal belonging to Group I or II of the periodic table, a salt of a metal belonging to Group I or II of the periodic table, and a multibranched polymer. The all-solid state secondary battery produced using the solid electrolyte composition of the embodiment of the invention as a layer-constituting material has a high discharge capacity retention, has a discharge capacity a decrease of which is suppressed even after the storage for a certain period of time from the manufacturing, and does not easily cause abnormality even in the case of being charged and discharged in an environment that is severer than that in the related art. The reason therefor is not clear, but is considered as follows.

It is considered that, in at least one layer of the positive electrode active material layer, the solid electrolyte layer, or the negative electrode active material layer which constitute the all-solid state secondary battery, the multibranched polymer having the arm portion that dissolves a metal ion of the salt of the metal belonging to Group I or II of the periodic table is contained as a binder, and thus the bonding property between solid particles (for example, an electrode active material and the sulfide-based inorganic solid electrolyte) improves, the state of solid particle interfaces is improved, and the metal ion is brought into the inside of the multibranched polymer, and thus it is possible to improve the metal ion conductivity at the interfaces. As a result, the all-solid state secondary battery produced using the solid electrolyte composition of the embodiment of the invention is excellent in terms of the cycle characteristics and the discharge capacity after being stored for a certain period of time from the manufacturing.

In addition, it is considered that the multibranched polymer is present on the interfaces between the sulfide-based inorganic solid electrolyte particles, and the growth during the generation of dendrite is suppressed, and thus battery abnormality such as a short-circuit is not easily caused.

(Inorganic Solid Electrolyte)

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (high-molecular-weight electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers (LiPF$_6$, LiBF$_4$, LiFSI, LiCl, and the like). The inorganic solid electrolyte is not particularly limited as long as the inorganic solid electrolyte has a conductivity of an ion of a metal belonging to Group I or II of the periodic table and is generally a substance not having electron conductivity.

In the present invention, the inorganic solid electrolyte has a conductivity of an ion of a metal belonging to Group I or II of the periodic table. As the inorganic solid electrolyte, it is possible to appropriately select and use solid electrolyte materials that are applied to this kind of products. Typical examples of the inorganic solid electrolyte include (i) sulfide-based inorganic solid electrolytes and (ii) oxide-based inorganic solid electrolytes. In the present invention, the sulfide-based inorganic solid electrolytes (preferably Li-P-S-based glass described below) are preferably used since it is possible to form a more favorable interface between the active material and the inorganic solid electrolyte.

Hereinafter, the sulfide-based inorganic solid electrolyte will be described. Sulfide-based inorganic solid electrolytes are preferably inorganic solid electrolytes which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive inorganic solid electrolytes satisfying a composition represented by Formula (I).

$$L_{a1}M_{b1}P_{c1}S_{d1}A_{e1} \quad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li-P-S-based glass containing Li, P, and S or Li-P-S-based glass ceramic containing Li, P, and S.

The sulfide-based inorganic solid electrolytes can be manufactured by a reaction of at least two raw materials of, for example, lithium sulfide (Li$_2$S), phosphorus sulfide (for example, diphosphorus pentasulfide (P$_2$S$_5$)), a phosphorus single body, a sulfur single body, sodium sulfide, hydrogen sulfide, lithium halides (for example, LiI, LiBr, and LiCl), or sulfides of an element represented by M (for example, SiS$_2$, SnS, and GeS$_2$).

The ratio between Li$_2$S and P$_2$S$_5$ in Li-P-S-based glass and Li-P-S-based glass ceramic is preferably 60:40 to 90:10 and more preferably 68:32 to 78:22 in terms of the molar ratio between Li$_2$S:P$_2$S$_5$. In a case in which the ratio between Li$_2$S and P$_2$S$_5$ is set in the above-described range, it is possible to increase the lithium ion conductivity. Specifically, the lithium ion conductivity can be preferably set to $1 \times 10^{-4}$ S/cm or more and more preferably set to $1$–$10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include Li$_2$S—P$_2$S$_5$, Li$_2$S-P$_2$S$_5$—LiCl, Li$_2$S—P$_2$S$_5$—H$_2$S, Li$_2$S—P$_2$S$_5$—H$_2$S—LiCl, Li$_2$S—LiI-P$_2$S$_5$, Li$_2$S—LiI—Li$_2$O—P$_2$S$_5$, Li$_2$S—LiBr-P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—P$_2$S$_5$—SiS$_2$—LiCl, Li$_2$S—P$_2$S$_5$—SnS, Li$_2$S—P$_2$S$_5$-Al$_2$S$_3$, Li$_2$S—GeS$_2$, Li$_2$S—GeS$_2$—ZnS, Li$_2$S—Ga$_2$S$_3$, Li$_2$S—GeS$_2$—Ga$_2$S$_3$, Li$_2$S-GeS$_2$—P$_2$S$_5$, Li$_2$S—GeS$_2$—Sb$_2$S$_5$, Li$_2$S—GeS$_2$—Al$_2$S$_3$, Li$_2$S—SiS$_2$, Li$_2$S—Al$_2$S$_3$, Li$_2$S—SiS$_2$—Al$_2$S$_3$, Li$_2$S—SiS$_2$—P$_2$S$_5$, Li$_2$S—SiS$_2$—P$_2$S$_5$—LiI, Li$_2$S—SiS$_2$—LiI, Li$_2$S—SiS$_2$—Li$_4$SiO$_4$, Li$_2$S—SiS$_2$—Li$_3$PO$_4$, Li$_{10}$GeP$_2$S$_{12}$, and the like. Mixing ratios of the respective raw materials do not matter. Examples of a method for synthesizing sulfide-based inorganic solid electrolyte materials using the above-described raw material compositions include an amorphization method. Examples of the amorphization method include a mechanical milling method, a solution method, and a melting quenching method. This is because treatments at normal temperature become possible, and it is possible to simplify manufacturing steps.

The volume-average particle diameter of the sulfide-based inorganic solid electrolyte is not particularly limited, but is preferably 0.01 μm or more and more preferably 0.1 μm or more. The upper limit is preferably 100 μm or less and more preferably 50 μm or less. Meanwhile, the average particle diameter of the sulfide-based inorganic solid electrolyte particles is measured in the following order. One percent by mass of a dispersion liquid is diluted and adjusted using the sulfide-based inorganic solid electrolyte particles and water (heptane in a case in which the inorganic solid electrolyte is unstable in water) in a 20 ml sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (manufactured by Horiba Ltd.), and a silica cell for measurement at a temperature of 25° C., thereby obtaining the volume-average particle diameter. Regarding other detailed conditions and the like, the description of HS Z8828:2013 "Particle size analysis-Dynamic light scattering method" is referred to as necessary. Five specimens are produced and measured per level, and the average values thereof are employed.

In a case in which a decrease in the interface resistance and the maintenance of the decreased interface resistance in the case of being used in the all-solid state secondary battery are taken into account, the content of the sulfide-based inorganic solid electrolyte in the solid component of the solid electrolyte composition is preferably 5% by mass or more, more preferably 10% by mass or more, and particularly preferably 20% by mass or more with respect to 100% by mass of the solid component. From the same viewpoint, the upper limit is preferably 99.9% by mass or less, more preferably 99.5% by mass or less, and particularly preferably 99% by mass or less.

These sulfide-based inorganic solid electrolytes may be used singly or two or more inorganic solid electrolytes may be used in combination.

Meanwhile, the solid content (solid component) in the present specification refers to a component that does not volatilize or evaporate in a nitrogen atmosphere at 80° C. Typically, the solid content refers to a component other than a dispersion medium described below.

(Salt of Metal Belonging to Group I or II of Periodic Table)

The salt of a metal belonging to Group I or II of the periodic table which is used in the present invention (hereinafter, also referred to as the metal salt) is not particularly limited, but a metal ion constituting the metal salt is preferably a lithium ion. Since a metal ion is easily liberated, an anion constituting the metal salt is preferably a bulky anion. Specific examples of the bulky anion include $PF_6^-$, $BF_4^-$, TFSI, and BETI. From the viewpoint of more efficiently dissolving the metal ion in the arm portion of the multibranched polymer that is used in the present invention, an organic anion is preferred. Specific examples of the organic anion include TFSI, BETI, FSI, and trifluoromethane sulfonic acid.

Hereinafter, specific examples of the metal salt that is used in the present invention will be described.

(L-1) Inorganic lithium salts: inorganic fluoride salts such as $LiPF_6$, $LiBF_4$, $LiAsF_6$, and $LiSbF_6$; perhalogen acid salts such as $LiClO_4$, $LiBrO_4$, and $LiIO_4$; inorganic chloride salts such as $LiAlCl_4$; and the like.

(L-2) Fluorine-containing organic lithium salts: perfluoroalkanesulfonate salts such as $LiCF_3SO_3$; perfluoroalkanesulfonylimide salts such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts such as $LiC(CF_3SO_2)_3$; fluoroalkylfluoride phosphate salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, $Li[PF_3(CF_2CF_2CF_2CF_3)_3]$; and the like.

(L-3) Oxalatoborate salts: lithium bis(oxalato)borate, lithium difluorooxalatoborate, and the like.

Among these, $LiPF_6$, $LiBF_4$, $LiAsF_6$, $LiSbF_6$, $LiClO_4$, $Li(Rf_1SO_3)$, $LiN(Rf_1SO_2)_2$, $LiN(FSO_2)_2$, and $LiN(Rf_1SO_2)(Rf_2SO_2)$ are preferred, and lithium imide salts such as $LiPF_6$, $LiBF_4$, $LiN(Rf_1SO_2)_2$, $LiN(FSO_2)_2$, and $LiN(Rf_1SO_2)(Rf_2SO_2)$ are more preferred. Here, $Rf_1$ and $Rf_2$ respectively represent perfluoroalkyl groups.

In the present invention, among the salts of a metal belonging to Group I or II of the periodic table, a lithium ion that is easily dissolved in the arm portion of the multibranched polymer that is used in the present invention can be increased, and thus $LiCF_3SO_3$ (lithium trifluoromethanesulfonate), LiBETI (lithium bis(pentafluoroethanesulfonyl)imide), LiTFSI (lithium bis(trifluoromethanesulfonyl)imide), LiFSI (lithium bis(fluorosulfonyl)imide), and LiBOB (lithium bisoxalatoborate) are preferably used.

Meanwhile, in the present invention, the salt of a metal belonging to Group I or II of the periodic table may be used singly or two or more salts may be used in combination.

The content of the salt of a metal belonging to Group I or II of the periodic table in the solid electrolyte composition of the embodiment of the invention is not particularly limited, but is preferably 5% by mass or more, more preferably 10% by mass or more, and particularly preferably 20% by mass or more with respect to 100% by mass of the total of the multibranched polymer and the salt of a metal belonging to Group I or II of the periodic table. Meanwhile, the upper limit is preferably 90% by mass or more, more preferably 85% by mass, and particularly preferably 80% by mass.

In a case in which the content of the salt of a metal belonging to Group I or II of the periodic table is in the above-described range, during the formation of the respective layers constituting the all-solid state secondary battery using the solid electrolyte composition of the embodiment of the invention, the salt of a metal is not precipitated, it becomes possible to use the all-solid state secondary battery in a state in which the metal ion is dissolved in the arm portion of the multibranched polymer, and it is possible to satisfy the improvement of both the ion conductivity and the battery performance (Multibranched Polymer)

The multibranched polymer that is used in the present invention has a core portion and at least three arm portions that bond to the core portion. The core portion is preferably a group of atoms having a molecular weight of 200 or more and more preferably a group of atoms having a molecular weight of 300 or more. The upper limit is preferably 5,000 or less, more preferably 4,000 or less, and particularly preferably 3,000 or less. This is because, in a case in which the molecular weight of the core portion is in the above-described range, the metal ion of the salt of a metal is efficiently dissolved in the multibranched polymer, and it becomes possible for the multibranched polymer in which the metal ion is dissolved and the inorganic solid electrolyte to more effectively interact with each other.

The core portion is preferably not only a tetravalent carbon atom. The core portion is preferably a linking group represented by $L—(X)_n$ in Formula (B). The arm portion is preferably $(P^1)_n$ in Formula (B).

Core Portion

The multibranched polymer preferably contains an oxygen atom, a sulfur atom, or a nitrogen atom and more preferably has an oxygen atom in the core portion. The multibranched polymer preferably has an oxygen atom, a sulfur atom, or a nitrogen atom and more preferably has an oxygen atom in a linking location (a location that directly bonds to the arm portion) with the arm portion.

In a case in which the multibranched polymer contains a sulfur atom in the core portion, the core portion preferably has a linking group of Formula (1a).

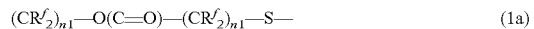

$$(CR^f_2)_{n1}—O(C=O)—(CR^f_2)_{n1}—S— \quad (1a)$$

In the formula, n1 represents an integer of 0 to 10. $R^f$ represents a hydrogen atom or a substituent and is preferably a hydrogen atom. As the substituent, a halogen atom (a fluorine atom, a chlorine atom, an iodine atom, or a bromine atom), an alkyl group (the number of carbon atoms is preferably 1 to 12, more preferably 1 to 6, and particularly preferably 1 to 3), an alkoxy group (the number of carbon atoms is preferably 1 to 12, more preferably 1 to 6, and particularly preferably 1 to 3), an acyl group (the number of carbon atoms is preferably 2 to 12, more preferably 2 to 6, and particularly preferably 2 or 3), an aryl group (the number of carbon atoms is preferably 6 to 22 and more preferably 6 to 10), an alkenyl group (the number of carbon atoms is preferably 2 to 12 and more preferably 2 to 5), a hydroxy group, a nitro group, a cyano group, a sulfanyl group, an amino group, an amide group, an acidic group (a carboxy group, a phosphoric acid group, a sulfonic acid group, or the like), and the like are exemplified (this group of substituents is referred to as a substituent T). Each of the acidic groups may be in a salt form. As a counter ion, an alkali metal ion, an alkali rare earth metal ion, an ammonium ion, an alkylammonium ion, and the like are exemplified.

The core portion of the multibranched polymer that is used in the present invention enables the metal ion dissolved in the arm portion to be efficiently brought into the inside of the polymer and thus preferably has a partial structure represented by any of the following formulae.

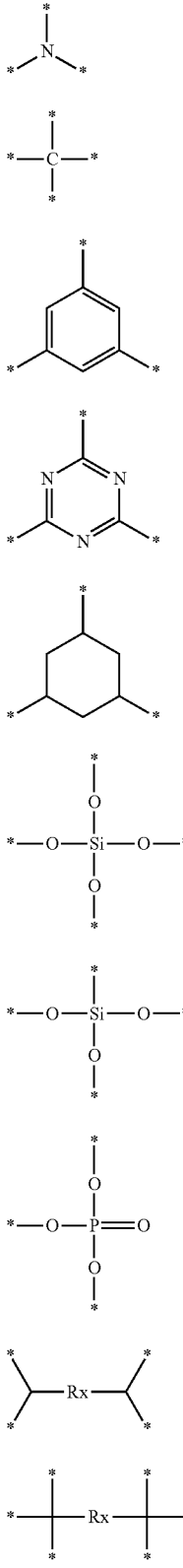

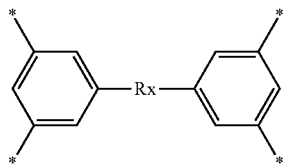

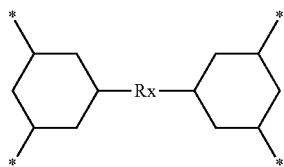

In the formulae, Rx represents a divalent substituent including an oxygen atom, a nitrogen atom, a sulfur atom, or a phosphorus atom. * represents a bonding site in the multibranched polymer.

The core portion of the multibranched polymer that is used in the present invention more efficiently brings the metal ion dissolved in the arm portion into the inside of the polymer and imparts a high ion conductivity and thus more preferably has a partial structure represented by any of the following formulae. * represents a bonding site in the multibranched polymer.

Hereinafter, specific examples of a compound (matrix) forming the core portion will be illustrated, but the present invention is not limited thereto. Meanwhile, a form in which a sulfanyl group, a hydroxy group, or a hydrogen atom in —NH$_2$ of the specific example is substituted with the arm portion is the multibranched polymer. For example, in a case in which this hydrogen atom becomes P$^1$ in Formula (B) or a group including P$^1$, the compound represented by Formula (B) is formed.
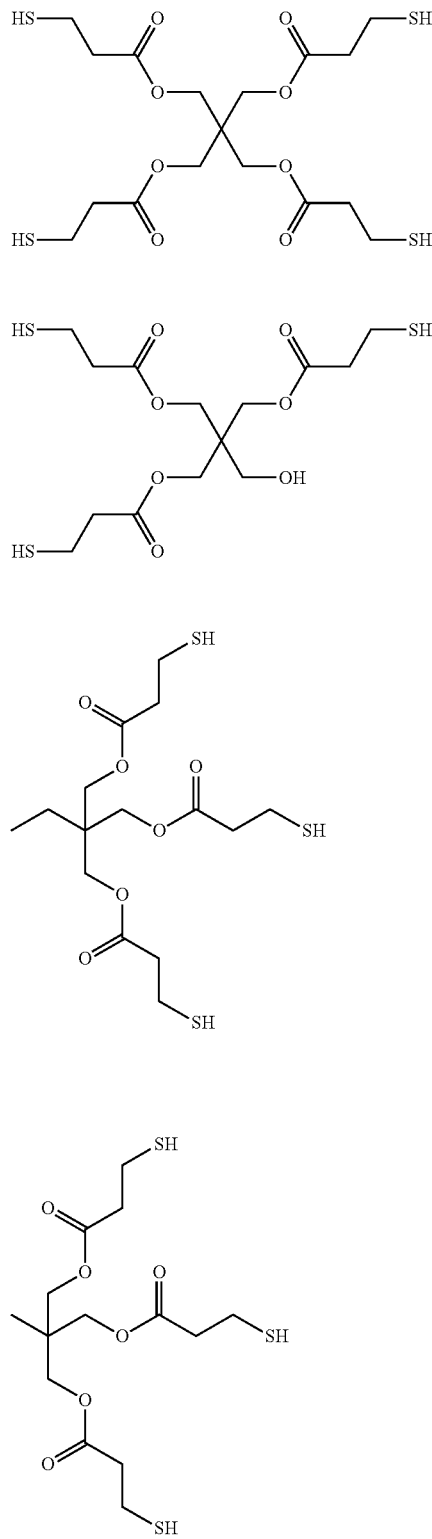
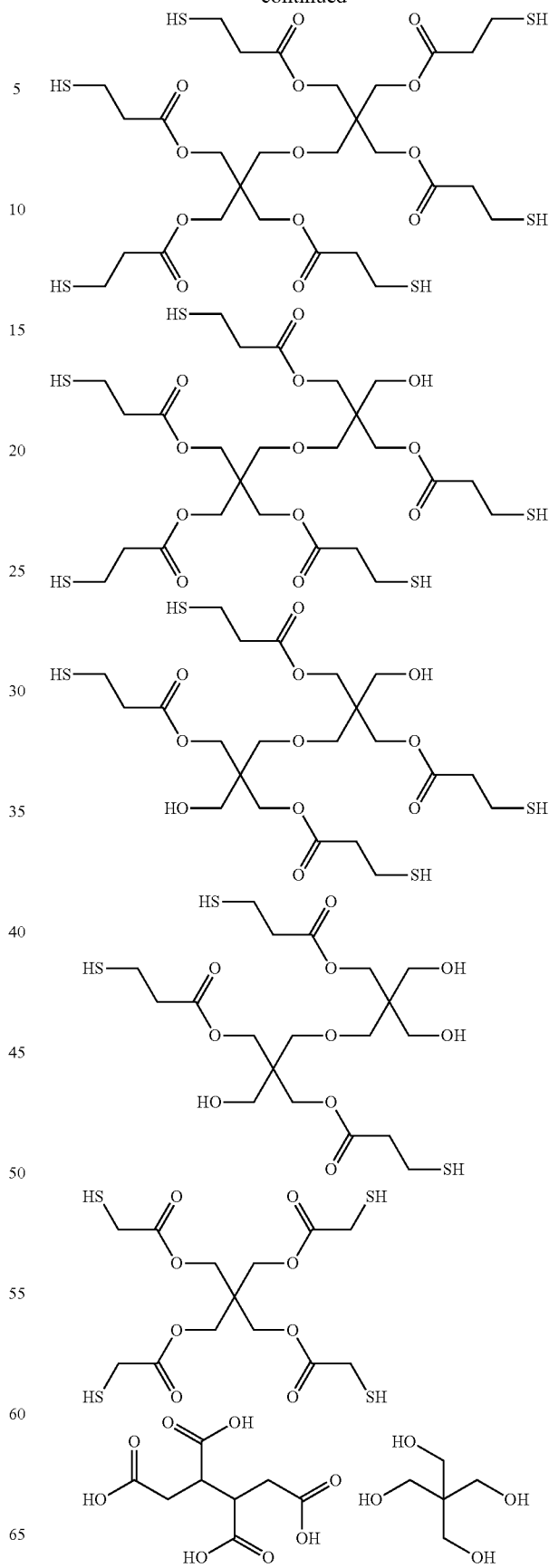

-continued

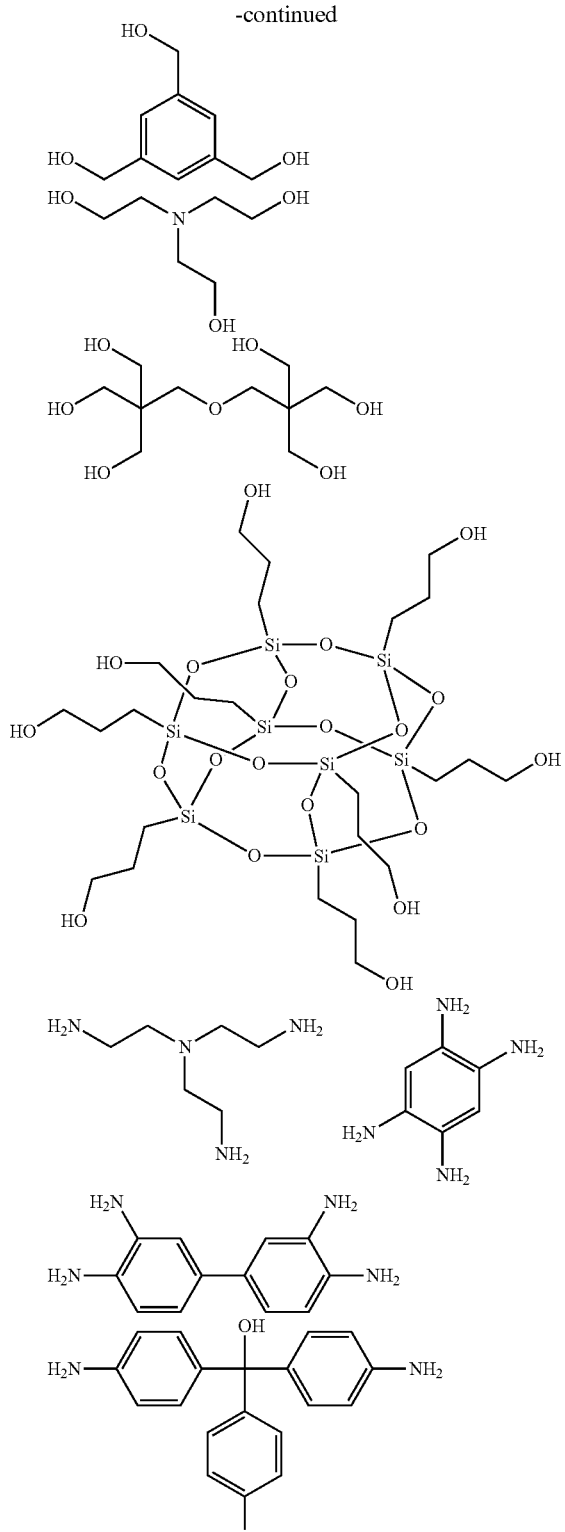

As the compound forming the core portion, for example, a commercially available product can be used.

The matrix forming the core portion of the multibranched polymer is preferably a matrix represented by any of Formulae (1) to (6). A form in which at least three hydrogen atoms (preferably at least three hydrogen atoms present in R) are substituted with the arm portion in each of the compounds of Formulae (1) to (6) is the multibranched polymer.

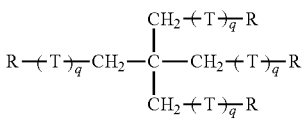 (1)

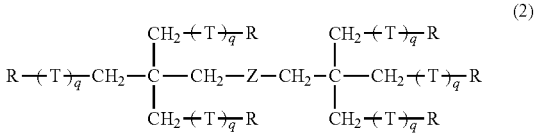 (2)

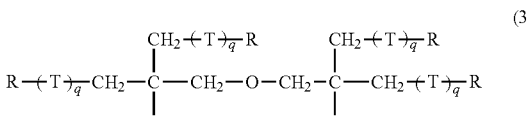 (3)

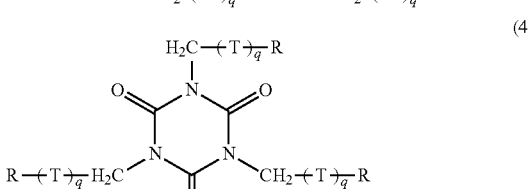 (4)

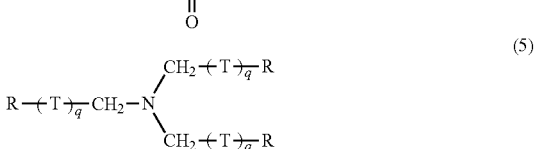 (5)

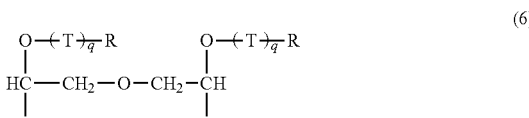 (6)

In the formulae, q is an integer, preferably 0 to 14, more preferably 0 to 5, and particularly preferably 1 to 3 respectively. R is a sulfanyl group, a hydroxy group, or an alkyl group (the number of carbon atoms is preferably 1 to 3). Here, R has three or more sulfanyl groups in a molecule. T is a linking group and preferably any of T1 to T5 described below or a linking group relating to a combination thereof. Z is a linking group and preferably a linking group represented by (Z1) or (Z2). Meanwhile, the orientations of T1 to T5 may be reversed in accordance with a formula.

 (T1)

 (T2)

 (T3)

 (T4)

 (T5)

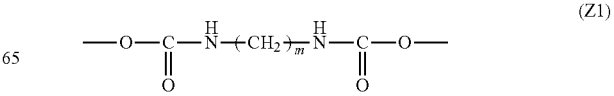 (Z1)

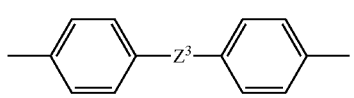
(Z2)

In the formulae, m is 1 to 8, more preferably 1 to 5, and particularly preferably 1 to 3 respectively. A plurality of R's and a plurality of T's present in one molecule may be identical to or different from each other. In a case in which T is an oxyalkylene group, a terminal on a carbon atom side is preferably bonded to R. Z3 is a linking group, preferably an alkylene group having 1 to 12 carbon atoms, and more preferably an alkylene group having 1 to 6 carbon atoms. In particular, a 2,2-propanediyl group is particularly preferred.

Arm Portion

The multibranched polymer that is used in the present invention has the arm portion. The structure of the arm portion is preferably a structure having a polyethylene chain as a main chain. As a side chain, —L$^1$—R$^2$ in Formula (A) is exemplified. The mass-average molecular weight of the arm portion is preferably 500 or more and more preferably 1,000 or more. The upper limit is preferably 1,000,000 or less and more preferably 500,000 or less.

It is because, in a case in which the mass-average molecular weight of the arm portion is in the above-described range, it is possible to satisfy both the solubility and fluidity of the metal ion, and it becomes possible to exhibit favorable characteristics (for example, the ion conductivity) in a broad temperature range.

The arm portion preferably has a structure derived from the following compound (the following compound-derived structure).

Compound having Alkylene Oxide Group

Methoxy polyethylene glycol acrylate, polyethylene glycol monomethyl ether, methoxy polyethylene glycol methacrylate, polyethylene glycol diacrylate, polyethylene glycol dimethacrylate, methoxy polypropylene glycol acrylate, polypropylene glycol monomethyl ether, methoxy polypropylene glycol methacrylate, polypropylene glycol diacrylate, and polypropylene glycol dimethacrylate Compound Having Carbonate Group Vinylene carbonate, vinylethylene carbonate, allyl methyl carbonate, allyl ethyl carbonate, polyethylene carbonate (PEC), polypropylene carbonate, polybutylene carbonate, and polycarbonate having an alkylene skeleton having 3 to 6 carbon atoms Compound Having Ester Group Valerolactone, butyrolactone, caprolactone, and polycarboxyethyl acrylate Compound Having Amide Group Nylon 6, polyglycine, polyalanine, nylon 66

Compound Having Silicone Group

Polydimethylsiloxane monomethyl acrylate, dimethylcyclopolysiloxane, tetramethoxysilane, dimethyldimethoxysilane, tetraethoxysilane, and tetrapropoxysilane The arm portion is also capable of having a repeating structure derived from a compound described in page 1 to 483, Chapter 2, Polymer Handbook 2nd ed., J. Brandrup, Wiley Interscience (1975) or the like.

Specific examples of the compound include a compound having one addition-polymerizable unsaturated bond selected from a styrene compound, 1-vinyl naphthalene, 2-vinyl naphthalene, vinyl carbazole, acrylic acid, methacrylic acid, a (meth)acrylic acid ester compound, a (meth)acrylamide compound, an allyl compound, a vinyl ether compound, a vinyl ester compound, a dialkyl itaconate compound, and the like.

As the styrene compound, styrene, vinylnaphthalene, 2,4,6-tribromostyrene, 2-phenylstyrene, 4-chlorostyrene, and the like are exemplified.

As the (meth)acrylic acid esters, a (meth)acrylic acid ester compound having a linear, branched, or cyclic alkyl group having 1 to 30 carbon atoms, a (meth)acrylic acid ester compound having a substituent other than an addition-polymerizable functional group such as 2-hydroxyethyl acrylate and trimethylolpropane monoacrylate, a (meth)acrylic acid ester compound having an aryl group such as benzyl (meth)acrylate and methoxybenzyl (meth)acrylate, a (meth)acrylic acid ester compound having a hetero ring such as furfuryl acrylate and tetrahydrofurfuryl acrylate, and the like are exemplified.

As the (meth)acrylamide compound, (meth)acrylamide, N-alkyl (meth)acrylamide (as an alkyl group, an alkyl group having 1 to 30 carbon atoms is exemplified, for example, a methyl group, an ethyl group, or a propyl group), N,N-dialkyl (meth)acrylamide (as an alkyl group, an alkyl group having 1 to 20 carbon atoms), N-hydroxyethyl-N-methyl (meth)acrylamide, N-2-acetamidoethyl-N-acetyl (meth)acrylamide, and the like are exemplified.

As the allyl compound, an allyl ester compound (for example, allyl acetate, allyl caproate, allyl caprylate, allyl laurate, allyl palmitate, allyl stearate, allyl benzoate, allyl acetoacetate, allyl lactate, or the like), allyloxyethanol, and the like are exemplified.

As the vinyl ether compound, alkyl vinyl ether (as an alkyl group, an alkyl group having 1 to 10 carbon atoms is exemplified), for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethyl butyl vinyl ether, hydroxyethyl vinyl ether, diethylene glycol vinyl ether, dimethylaminoethyl vinyl ether, diethylaminoethyl vinyl ether, butyl aminoethyl vinyl ether, benzyl vinyl ether, tetrahydrofurfuryl vinyl ether, and the like are exemplified.

As the vinyl ester compound, vinyl butyrate, vinyl isobutyrate, vinyl trimethyl acetate, vinyl diethyl acetate, vinyl valate, vinyl caproate, vinyl chloroacetate, vinyl dichloroacetate, vinyl methoxy acetate, vinyl butoxy acetate, vinyl lactate, vinyl-β-phenylbutyrate, vinyl cyclohexyl carboxylate, and the like are exemplified.

As the dialkyl itaconate compound, dimethyl itaconate, diethyl itaconate, dibutyl itaconate, and the like are exemplified.

Additionally, crotonic acid, itaconic acid, acrylonitrile, methacrylonitrile, maleylonitrile, and the like can also be exemplified.

The arm portion of the multibranched polymer that is used in the present invention preferably contains at least one repeating unit having an alkylene oxide group —((CH$_2$)$_{n2}$—O)$_{m2}$— (n2 and m2 each independently represent a positive integer, n2 is preferably an integer of 2 to 6, and m2 is preferably an integer of 5 to 1,000)), a carbonate group (—O—C(=O)—O—), an ester group (—C(=O)—O—), an amide group (—C(=O)—N(R$^4$)—), or a silicone group (—O—Si(OR$^5$)$_2$—O—). R$^4$ represents a hydrogen atom or a substituent (for example, the substituent T). R$^5$ represents a substituent (for example, the substituent T).

That is, the multibranched polymer that is used in the present invention preferably includes an alkylene oxide group, a carbonate group, an ester group, an amide group, or a silicone group as a group that dissolves the metal ion of the salt of a metal belonging to Group I or II of the periodic table (hereinafter, also referred to as the "metal ion-dissolving group") in a side chain of a polymer structure constituting the arm portion. This is because, in a case in which the multibranched polymer that is used in the present invention includes the metal ion-dissolving group in the side chain, it is possible to maintain the metal ion-dissolving group to be highly mobile and favorably dissolve the metal ion.

The arm portion including the metal ion-dissolving group in the side chain is preferably a structure having at least one repeating unit represented by Formula (A) since it is possible to make the arm portion a robust polymer component, and it is possible to exhibit favorable repeating battery characteristics. A terminal of the main chain of the arm portion other than linking portions that bond to the core portion may be a random structure, and a hydrogen atom, a methyl group, a residue of a polymerization inhibitor, and the like are exemplified. In Formula (A), —$R^1$ and —$L^1$—$R^2$ are side chains of the arm portion, and portions other than —$R^1$ and —$L^1$—$R^2$ are the main chain of the arm portion.

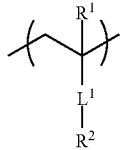

Formula (A)

In the formula, $R^1$ represents a hydrogen atom, a halogen atom, a cyano group, a substituted or unsubstituted alkyl group (the number of carbon atoms is preferably 1 to 12, more preferably 1 to 6, and particularly preferably 1 to 3), a substituted or unsubstituted alkoxy group (the number of carbon atoms is preferably 1 to 12, more preferably 1 to 6, and particularly preferably 1 to 3), or a substituted or unsubstituted aryl group (the number of carbon atoms is preferably 6 to 22 and more preferably 6 to 10). As the random substituent, the substituent T is exemplified.

$R^2$ represents a hydrogen atom, a halogen atom, a cyano group, an alkyl group (the number of carbon atoms is preferably 1 to 12, more preferably 1 to 6, and particularly preferably 1 to 3), an alkoxy group (the number of carbon atoms is preferably 1 to 12, more preferably 1 to 6, and particularly preferably 1 to 3), or an aryl group (the number of carbon atoms is preferably 6 to 22 and more preferably 6 to 10), or a hydroxy group. Preferably, $R^2$ represents a linear or branched alkoxy group or hydroxy group. In the case of representing an alkyl group, an alkoxy group, or an aryl group, $R^2$ may further have the substituent T.

$L^1$ represents a divalent linking group including at least one metal ion-dissolving group. $L^1$ may be combined with a group other than the metal ion-dissolving group to constitute a divalent linking group, and, as a group that is combined with at least one metal ion-dissolving group to form $L^1$, a divalent linking group selected from —C(=O)—, —O—, —$NR^N$—($R^N$ represents a hydrogen atom, an alkyl group having 1 to 6 carbon atoms (preferably 1 to 4 carbon atoms), or an aryl group having 6 to 14 carbon atoms), —C(=O)O—, —OC(=O)—, —OC(=O)O—, —C(=O)N($R^N$)—, an arylene group (the number of carbon atoms is preferably 6 to 22 and more preferably 6 to 14), and an alkylene group (the number of carbon atoms is preferably 1 to 12, more preferably 1 to 6, and particularly preferably 1 to 3), or a divalent linking group formed by combining two or more divalent linking groups described above. Among these, the group that is combined with at least one metal ion-dissolving group to form $L^1$ is preferably a divalent linking group selected from —C(=O)—, —C(=O)O—, and —OC(=O)— or a divalent linking group formed by combining two or more divalent linking groups described above, $L^1$ is preferably bonded with a carbon atom in the main chain of the arm portion using a carbon atom in —C(=O)—, —C(=O)O—, or —OC(=O)— and preferably bonded with a carbon atom in the main chain of the arm portion using a carbon atom in —C(=O)—.

As a preferred specific example of —$L^1$—$R^2$, —C(=O)—(repeating unit including metal-dissolving group)$_{n3}$-alkoxy group is exemplified. Meanwhile, n3 represents an integer of 2 or more.

The proportion of the metal ion-dissolving group in $L^1$ is not particularly limited, but is preferably 20% by mass or more, more preferably 50% by mass or more, and particularly preferably 70% by mass or more. The upper limit is not limited, but is preferably 100% by mass or less. In a case in which the proportion is in the above-described range, it is possible to satisfy both the physical characteristics (ease of break) of the polymer and the metal ion dissolution.

The copolymerization ratio between the repeating unit represented by Formula (A) and other repeating units is not particularly limited, but the percentage of the repeating unit represented by Formula (A) is preferably 5% or more, more preferably 10% or more, and particularly preferably 20% or more in terms of the molar ratio. The upper limit is not particularly limited and may be 100% or less. As other repeating units that are copolymerized, repeating units described in page 1 to 483, Chapter 2, Polymer Handbook $2^{nd}$ ed., J. Brandrup, Wiley Interscience (1975) and the like are exemplified.

In addition, the multibranched polymer that is used in the present invention is also preferably constituted by including an alkylene oxide group, a carbonate group, an ester group, an amide group, or a silicone group, which are the metal ion-dissolving groups, in the main chain of the polymer structure constituting the arm portion instead of a side chain of the polymer structure. In this case, a polyalkylene oxide chain, a polycarbonate chain, a polyester chain, a polyamide chain, or a polysiloxane chain is preferably combined into the main chain of the polymer structure constituting the arm portion. In a case in which the multibranched polymer that is used in the present invention includes the metal ion-dissolving group as a constituent component forming the main chain of the arm portion, it is possible to enhance the mobility of the metal ion-dissolving group, and it is possible to efficiently dissolve metal ions.

The arm portion including the metal ion-dissolving group as the constituent component forming the main chain of the arm portion is preferably a structure represented by Formula (C).

*—$L^{11}$—$R^{12}$  Formula (C)

In the formula, $L^{11}$ represents a divalent group of a polymer structure formed by the combination of the metal ion-dissolving group into the main chain. $L^{11}$ may be combined with a group other than the metal ion-dissolving group to constitute a divalent group, and, as a group that is combined with the repeating unit to form $L^{11}$, a group that is combined with the at least one metal ion-dissolving group to form $L^1$ (hereinafter, also referred to as "$L^X$") is exemplified, and a divalent linking group selected from —C(=O)—, —O—, —C(=O)O—, —OC(=O)—, —OC (=O)O—, and an alkylene group or a divalent linking group formed by combining two or more divalent linking groups described above is preferred.

The proportion of the metal ion-dissolving group in $L^{11}$ is not particularly limited, but is preferably 50% by mass or more, more preferably 70% by mass or more, and particularly preferably 90% by mass or more. The upper limit is not limited, but is preferably 100% by mass or less.

$R^{12}$ represents a hydrogen atom, a halogen atom, a cyano group, an alkyl group (the number of carbon atoms is preferably 1 to 12, more preferably 1 to 6, and particularly preferably 1 to 3), an alkoxy group (the number of carbon atoms is preferably 1 to 12, more preferably 1 to 6, and particularly preferably 1 to 3), or an aryl group (the number of carbon atoms is preferably 6 to 22 and more preferably 6 to 10), or a hydroxy group. Preferably, $R^{12}$ represents a linear or branched alkyl group. In the case of representing an alkyl group, an alkoxy group, or an aryl group, $R^{12}$ may further have the substituent T.

* represents a bonding site with the core portion.

Specific examples of —$L^{11}$—$R^{12}$ include -LX-(repeating unit including metal-dissolving group in main chain)$_{n4}$-alkyl group or -(repeating unit including metal-dissolving group in main chain)$_{n4}$-alkoxy group. Meanwhile, n4 represents an integer of 2 or more.

In the case of having a substituent that strongly interacts with a metal ion, the multibranched polymer that is used in the present invention is capable of favorably dissolving the metal ion and capable of improving the battery performance and is thus preferably formed of a compound represented by Formula (B).

$$L + X - P^1)_n \quad \text{Formula (B)}$$

In the formula, L represents an n- or higher-valent linking group. The valence of L is realistically octavalent or lower.

$P^1$ represents a polymer chain. n represents an integer of 3 or more and is preferably 6 or more. $nP^1$'s may be identical to or different from each other. $P^1$ constitutes the arm portion. X represents an oxygen atom, a sulfur atom, or —N($R^3$)—, and $R^3$ represents a hydrogen atom, an alkyl group (the number of carbon atoms is preferably 1 to 3 and more preferably 1 or 2), or an aryl group (the number of carbon atoms is preferably 6 to 12 and more preferably 6 to 10).

The multibranched polymer that is used in the present invention is also preferably represented by Formula (2).

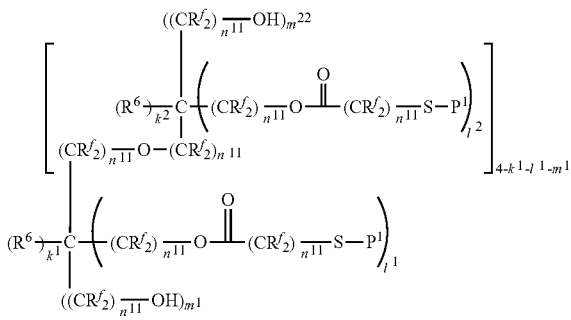

In the formula, $R^6$ represents a hydrogen atom or a substituent (for example, the substituent T). Among these, a hydrogen atom, a halogen atom, a substituted or unsubstituted alkyl group (the number of carbon atoms is preferably 1 to 12, more preferably 1 to 6, and particularly preferably 1 to 3), a substituted or unsubstituted alkoxy group (the number of carbon atoms is preferably 1 to 12, more preferably 1 to 6, and particularly preferably 1 to 3), and a substituted or unsubstituted aryl group (the number of carbon atoms is preferably 6 to 22 and more preferably 6 to 14) are represented. Examples of the substituent that the alkyl group, the alkoxy group, and the aryl group may have include the substituent T, and, particularly, a hydroxy group is preferred. The alkyl group may have an oxygen atom interposed therein and may be, for example, an oligo-oxyalkylene group. An oligo-alkylene group is preferably a group represented by Formula (OA). As an alkyl group having a halogen atom, a fluoroalkyl group can be exemplified.

$R^f$ and $P^f$ are identical to those in Formulae (A) and (1a).

$n^{11}$'s each independently represent an integer of 0 to 10 and are preferably 0 to 8 and more preferably 0 to 6.

$k^1$ represents an integer of 0 to 3 and is preferably 0 to 2.

$l^1$ represents an integer of 0 to 4 and is preferably 1 to 4 and more preferably 2 to 4.

$m^1$ represents an integer of 0 to 3 and is preferably 0 to 2 and more preferably 0 or 1.

$k^2$ represents an integer of 0 to 3 and is preferably 0 to 2 and more preferably 0 or 1.

$l^2$ represents an integer of 0 to 3 and is preferably 1 to 3 and more preferably 2 or 3.

$m^{22}$ represents an integer of 0 to 3 and is preferably 0 to 2 and more preferably 0 or 1.

Here, the sum of $k^1$, $l^1$, and $m^1$ is 4 or less. The sum of $k^2$, $l^2$, and $m^{22}$ is 3 or less. The number of groups having $P^1$ is 3 or more and more preferably 4 or more. That is, $l^1+l^2\times(4-k^1-l^1-m^1)$ reaches 3 or more and is preferably 4 or more. The upper limit is preferably 8 or less and more preferably 6 or less. This —SH preferably constitutes a linking portion with the arm portion, and the core portion and the arm portion are preferably linked together through —S—.

Mass-Average Molecular Weight

The mass-average molecular weight of the multibranched polymer that is used in the present invention is not particularly limited, but is preferably 1,700 or more, more preferably 2,000 or more, and particularly preferably 3,500 or more. The upper limit is preferably 3,000,000 or less, more preferably 1,500,000 or less, still more preferably 1,000,000 or less, far still more preferably 500,000 or less, and particularly preferably 100,000 or less.

Unless particularly otherwise described, as the mass-average molecular weight of the multibranched polymer that is used in the present invention, a standard polystyrene-equivalent mass-average molecular weight is measured by means of gel permeation chromatography (GPC). Regarding a measurement method, the mass-average molecular weight is basically a value measured using a method of condition 1 or condition 2 (preferential) described below. Here, an appropriate eluent is appropriately selected and used depending on the kind of the polymer.

Meanwhile, the mass-average molecular weight of the arm portion of the multibranched polymer that is used in the present invention is preferably 500 or more, preferably 1,000 or more, and more preferably 2,000 or more. The upper limit is preferably 10,000,000 or less, more preferably 1,000,000 or less, and particularly preferably 100,000 or less.

(Condition 1)
Column: A column obtained by connecting TOSOH TSKgel Super AWM-H (trade name)
Carrier: 10 mM LiBr/N-methylpyrrolidone
(Condition 2) . . . Preferential
Column: A column obtained by connecting TOSOH TSKgel Super HZM-H, TOSOH TSKgel Super HZ4000, and TOSOH TSKgel Super HZ 2000 (all trade names)
Carrier: Tetrahydrofuran The multibranched polymer preferably has a particle shape. The multibranched polymer is dispersed in a dispersion medium, and the average particle diameter is preferably 1 nm or more, more preferably 5 nm or more, and particularly preferably 12 nm or more. The upper limit is preferably 1,000 nm or less, more preferably 500 nm or less, still more preferably 300 nm or less, and particularly preferably 100 nm or less. In a case in which the average particle diameter of the multibranched polymer is set in the above-described range, it is possible to realize a favorable bonding property between the respective layers constituting the all-solid state secondary battery and between solid particles and a favorable ion conductivity of the all-solid state secondary battery.

Unless particularly otherwise described, the average particle diameter of the multibranched polymer particles that are used in the present invention refers to an average particle diameter based on measurement conditions and a definition described below.

One percent by mass of a dispersion liquid is prepared by diluting the multibranched polymer particles using a random solvent (a dispersion medium that is used to prepare the solid electrolyte composition, for example, heptane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is used as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, the average particle diameter can be measured from the produced all-solid state secondary battery by, for example, disassembling the battery, peeling the electrodes off, then, measuring the average particle diameters of the electrode materials according to the above-described method for measuring the average particle diameter of the multibranched polymer particles, and excluding the measurement value of the average particle diameter of particles other than the multibranched polymer particles which has been measured in advance.

<Method for Synthesizing Multibranched Polymer>

The multibranched polymer that is used in the present invention can be synthesized using an ordinary method with reference to, for example, the section of the ring-opening polymerization in "Synthesis of Polymers (II)" published by Kodansha Ltd., IV$^{th}$ edition.

The method for synthesizing the multibranched polymer may be a method in which a synthesized arm portion polymer is coupled with an at least trifunctional core portion. In addition, the method may be a method in which polymerization initiates from a tri- or higher-functional core portion in a sequential or chain-reaction manner, thereby forming an arm portion polymer. A method in which radical polymerization is carried out using a chain transfer agent can also be exemplified. As the chain transfer agent, a thiol-containing compound can be exemplified, and a method in which radical polymerization is carried out in the presence of an at least trifunctional thiol-containing compound is preferred due to the convenience of the process. In a case in which the arm portion and the core portion are linked together using an ene-thiol reaction as described above, a thiol (sulfanyl) group may be present on the matrix side of the core portion or on the matrix side of the arm portion. In the present invention, a thiol group is regulated to be present on the matrix side of the core portion from the specific convenience due to the necessity.

The content of the multibranched polymer in the solid electrolyte composition of the embodiment of the invention is preferably 0.1 parts by mass or more, more preferably 0.5 parts by mass or more, and particularly preferably 1 part by mass or more with respect to 100 parts by mass of the inorganic solid electrolyte (the total amount including the amount of an active material in a case in which the solid electrolyte composition includes the active material). The upper limit is preferably 50 parts by mass or less, more preferably 30 parts by mass or less, and particularly preferably 10 parts by mass or less. It is because, in a case in which the content is in the above-described range, it becomes possible to further improve the bonding property between solid particles and between the respective layers while maintaining a high ion conductivity.

The content of the multibranched polymer in the total solid component of the solid electrolyte composition of the embodiment of the invention is preferably 0.1% by mass or more, more preferably 0.5% by mass or more, and particularly preferably 1% by mass or more. The upper limit is preferably 30% by mass or less, more preferably 10% by mass or less, and particularly preferably 5% by mass or less.

Meanwhile, the solid component in the present specification refers to a component that does not volatilize or evaporate and thus disappear in the case of being subjected to a drying treatment in a nitrogen atmosphere at 170° C. for six hours. Typically, the solid content refers to a component other than a dispersion medium described below.

The multibranched polymer may be used singly or two or more multibranched polymers may be used in combination.

In the present specification, individual technical matters such as a temperature and a thickness as well as a substituent in a compound and a decision branch of a linking group can be combined together even in a case in which risks thereof each are independently described.

In the all-solid state secondary battery of the embodiment of the invention, the multibranched polymer is employed, whereby it is possible to suppress an increase in the interface resistance by improving the electrode flexibility. The reason therefor is considered as described below although assumption is included. That is, due to the introduction of a branched structure, the multibranched polymer is a single molecule, the molecular chain spreads only to a small extent, and the multibranched polymer is not easily entangled with other molecules. Meanwhile, a linear polymer is easily entangled with other molecules, and the size of a bonding point tend to become large in a drying process or the like. Due to the above-described difference, it is understood that, in a case in which the multibranched polymer according to the present invention is employed, the ion conductivity is improved while the flexibility or the bonding property is maintained favorably. Particularly, the multibranched polymer having an acidic group or the like in the arm portion is preferred from the viewpoint of the relationship with an inorganic solid electrolyte as described above.

Polymerization Initiator

For the synthesis of the multibranched polymer of the present invention, a polymerization initiator is preferably added. Particularly, a radical polymerization initiator is preferably used.

As a thermal radical polymerization initiator that is cleaved by heat and generates an initiation radical, ketone peroxides such as methyl ethyl ketone peroxide, methyl isobutyl ketone peroxide, acetyl acetone peroxide, cyclohexanone peroxide, and methyl cyclohexanone peroxide; hydroperoxides such as 1,1,3,3-tetramethylbutyl hydroperoxide, cumene hydroperoxide, and t-butyl hydroperoxide; diacyl peroxides such as diisobutyryl peroxide, bis-3,5,5-trimethylhexanoyl peroxide, lauroyl peroxide, benzoyl peroxide, and m-toluylbenzoyl peroxide; dialkyl peroxides such as dicumyl peroxide, 2,5-dimethyl-2,5-di(t-butylperoxy) hexane, 1,3-bis(t-butylperoxyisopropyl) hexane, t-butylcumylperoxide, di-t-butylperoxide, and 2,5-dimethyl-2,5-di (t-butylperoxy) hexene; peroxyketals such as 1,1-di(t-butylperoxy-3,5,5-trimethyl) cyclohexane, 1,1-di-t-butylperoxycyclohexane, and 2,2-di(t-butylperoxy) butane; alkyl peresters such as t-hexyl peroxypivalate, t-butyl peroxypivalate, 1,1,3,3-tetramethylbutyl peroxy-2-ethylhexanoate, t-amyl peroxy-2-ethylhexanoate, t-butyl peroxy-2-ethylhexanoate, t-butyl peroxyisobutyrate, di-t-butyl peroxyhexahydroterephthalate, 1,1,3,3-tetramethylbutylperoxy-3,5,5-trimethylhexanate, t-amylperoxy-3,5,5-trimethylhexanoate, t-butyl peroxy-3,5,5-trimethyl hexanoate, t-butyl peroxyacetate, t-butyl peroxybenzoate, and dibutyl peroxytrimethyl adipate; peroxycarbonates such as 1,1,3,3-tetramethylbutyl peroxyneodicarbonate, α-cumyl peroxyneodicarbonate, t-butyl peroxyneodicarbonate, di-3-methoxybutyl peroxydicarbonate, di-2-ethylhexyl peroxydicarbonate, bis (1,1-butylcyclohexaoxy dicarbonate), diisopropyloxy dicarbonate, t-amyl peroxy isopropyl carbonate, t-butyl peroxy isopropyl carbonate, t-butyl peroxy-2-ethylhexyl carbonate, and 1,6-bis(t- butylperoxycarboxy) hexane; 1,1-bis(t-hexylperoxy) cyclohexane, (4-t-butylcyclohexyl) peroxydicarbonate, and the like.

Specific examples of an azo compound that is used as an azo-based polymerization initiator include 2,2'-azobisisobutyronitrile, 2,2'-azobis(2-methylbutyronitrile), 2,2'-azobis(2,4-dimethylvaleronitrile) (trade name: V-65), 1,1'-azobis-1-cyclohexanecarbonitrile, dimethyl-2,2'-azobisisobutyrate, 4,4'-azobis-4-cyanovaleric acid, 2,2'-azobis-(2-amidino propane) dihydrochloride, and the like (refer to JP2010-189471A and the like). Alternatively, dimethyl-2,2'-azobis (2-methylpropionate) (trade name: V-601, manufactured by Wako Pure Chemical Industries, Ltd.) and the like are also preferably used.

As the radical polymerization initiator, in addition to the above-described thermal radical polymerization initiator, radical polymerization initiators that generate an initiator radical with light, an electron beam, or a radioactive ray can be used.

As the above-described radical polymerization initiators, benzoin ether, 2,2-dimethoxy-1,2-diphenylethan-1-one [IRGACURE 651, manufactured by Ciba Specialty Chemicals Inc., trademark], 1-hydroxy-cyclohexyl-phenyl-ketone [IRGACURE 184, manufactured by Ciba Specialty Chemicals Inc., trademark], 2-hydroxy-2-methyl-1-phenyl-propane-1-one [DAROCUR 1173, manufactured by Ciba Specialty Chemicals Inc., trademark], 1-[4-(2-hydroxyethoxy)-phenyl]-2-hydroxy-2-methyl-1-propane-1-one [IRGACURE 2959, manufactured by Ciba Specialty Chemicals Inc., trademark], 2-hydroxy-1-[4-[4-(2-hydroxy-2-methyl-propionyl)-benzyl]phenyl]-2- methyl-propane-1-one [IRGACURE 127, manufactured by Ciba Specialty Chemicals Inc., trademark], 2-methyl-1-(4-methylthiophenyl)-2-morpholinopropane-1-one [IRGACURE 907, manufactured by Ciba Specialty Chemicals Inc., trademark], 2-benzyl-2-dimethylamino-1-(4-morpholinophenyl)-butanone-1 [IRGACURE 369, manufactured by Ciba Specialty Chemicals Inc., trademark], 2-(dimethylamino)-2-[(4-methylphenyl)methyl]-1-[4-(4-monopholinyl)phenyl]-1-butanone [IRGACURE 379, manufactured by Ciba Specialty Chemicals Inc., trademark], 2,4,6-trimethylbenzoyl-diphenyl-phosphine oxide (DAROCUR TPO, manufactured by Ciba Specialty Chemicals Inc., trademark), bis(2,4,6-trimethylbenzoyl)-phenylphosphine oxide [IRGACURE 819, manufactured by Ciba Specialty Chemicals Inc., trademark], bis($\eta^5$-2,4-cyclopentadien-1-yl)-bis(2,6-difluoro-3-(1H-pyrrol-1-yl)-phenyl) titanium [IRGACURE 784, manufactured by Ciba Specialty Chemicals, Inc., trademark], 1,2-octanedione, 1-[4-(phenylthio)-, 2-(O-benzoyloxime)] [IRGACURE OXE 01, manufactured by Ciba Specialty Chemicals Inc., trademark], ethanone, 1-[9-ethyl-6-(2-methylbenzoyl)-9H-carbazol-3-yl]-, 1-(O-acetyloxime) [IRGACURE OXE 02, manufactured by Ciba Specialty Chemicals Inc., trademark] can be exemplified.

These radical polymerization initiators can be used singly or two or more radical polymerization initiators can be used in combination.

Regarding the content of the polymerization initiator, the polymerization initiator is preferably applied in an amount of 0.01 parts by mass to 20 parts by mass with respect to 100 parts by mass of monomers.

Polymerization Inhibitor

For the synthesis of the multibranched polymer that is used in the present invention, a polymerization inhibitor may be added. As the polymerization inhibitor, for example, phenols such as hydroquinone, t-butyl hydroquinone, catechol, and hydroquinone monomethyl ether; quinones such as benzoquinone and diphenylbenzoquinone; phenothiazines; copper; 2,2,6,6-tetramethylpiperidine 1-oxyl; and the like can be used.

For the synthesis of the multibranched polymer that is used in the present invention, a reaction medium may be used. As a medium that is preferably used, an aliphatic compound solvent, an ether-based solvent, an ester-based solvent, and a ketone-based solvent are exemplified, and it is possible to use toluene, n-heptane, n-hexane, cyclohexane, cyclopentane, octane, decane, dibutyl ether, diisopropyl ether, t-butyl methyl ether, cyclohexyl methyl ether, methyl acetate, ethyl acetate, acetone, methyl ethyl ketone, and cyclohexanone without any particular limitation.

The temperature of a polymerization reaction is not particularly limited, needs to be adjusted depending on a monomer or a reaction medium to be applied, but is, for example, preferably 40° C. or higher, more preferably 50° C. or higher, and particularly preferably 60° C. or higher. There is no particular upper limit, but the upper limit is realistically 150° C. or lower.

(Dispersion Medium)

The solid electrolyte composition of the embodiment of the invention preferably contains a dispersion medium for dispersing the solid component.

Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6- hexanediol, cyclohexanediol, sorbitol, xylitol, 2-methyl-2,4-pentanediol, 1,3-butanediol, and 1,4-butanediol.

As an ether compound solvent, alkylene glycol alkyl ethers, ethylene glycol monomethyl ether (ethylene glycol monobutyl ether, diethylene glycol, dipropylene glycol, propylene glycol monomethyl ether, diethylene glycol monomethyl ether, triethylene glycol, polyethylene glycol, propylene glycol dimethyl ether, dipropylene glycol monomethyl ether, tripropylene glycol monomethyl ether, diethylene glycol monobutyl ether, diethylene glycol dibutyl ether, and the like), dialkyl ethers (dimethyl ether, diethyl ether, diisopropyl ether, dibutyl ether, and the like), alkyl aryl ether (anisole), tetrahydrofuran, dioxane (including each of 1,2-, 1,3-, and 1,4- isomers), t-butyl methyl ether, and cyclohexyl methyl ether are exemplified.

Examples of an amide compound solvent include N,N-dimethylformamide, 1-methyl-2-pyrrolidone, 2-pyrrolidinone, 1,3-dimethyl-2-imidazolidinone, E-caprolactam, formamide, N-methylformamide, acetamide, N-methylacetamide, N,N-dimethylacetamide, N-methylpropanamide, and hexamethylphosphoric triamide.

Examples of an amino compound solvent include triethylamine, diisopropylethyl amine, and tributylamine.

Examples of a ketone compound solvent include acetone, methyl ethyl ketone, methyl isobutyl ketone, and cyclohexanone.

Examples of an aromatic compound solvent include benzene, toluene, xylene, and mesitylene.

Examples of an aliphatic compound solvent include hexane, heptane, cyclohexane, methylcyclohexane, octane, pentane, cyclopentane, and the like.

Examples of a nitrile compound solvent include acetonitrile, propionitrile, and butyronitrile.

The boiling point of the dispersion medium at normal pressure (one atmospheric pressure) is preferably 50° C. or higher and more preferably 70° C. or higher. The upper limit is preferably 250° C. or lower and more preferably 220° C. or lower. One kind of the dispersion medium may be used singly or two or more kinds of the dispersion media may be used in combination.

In the present invention, among them, the aliphatic compound solvent and the ether compound solvent are preferred, and heptane, dibutyl ether, and a solvent mixture thereof are more preferred.

Meanwhile, the content of the dispersion medium in the solid electrolyte composition of the embodiment of the invention is not particularly limited, but is preferably 20% to 80% by mass, more preferably 30% to 70% by mass, and particularly preferably 40% to 60% by mass.

(Active Materials)

The solid electrolyte composition of the embodiment of the invention may also contain an active material capable of intercalating and deintercalating ions of metal elements belonging to Group I or II of the periodic table. Examples of the active materials include positive electrode active materials and negative electrode active materials, and transition metal oxides that are positive electrode active materials or metal oxides that are negative electrode active materials are preferred.

In the present invention, the solid electrolyte composition containing the active material (a positive electrode active material or a negative electrode active material) will be referred to as a composition for an electrode (a composition for a positive electrode or a composition for a negative electrode).

Positive Electrode Active Material

A positive electrode active material that the solid electrolyte composition of the embodiment of the invention may contain is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (11a), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the transition metal oxides having a bedded salt-type structure (MA) is preferred, and LCO, LMO, NCA, or NMC is more preferred.

The shape of the positive electrode active material is not particularly limited, but is preferably a particle shape. The volume-average particle diameter (circle-equivalent average particle diameter) of positive electrode active material particles is not particularly limited. For example, the volume-average particle diameter can be set to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming a positive electrode active material layer, the mass (mg) of the positive electrode active material per unit area ($cm^2$) of the positive electrode active material layer (weight per unit area) is not particularly limited and can be appropriately determined depending on the set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 55% to 80% by mass with respect to a solid component of 100% by mass.

Negative Electrode Active Material

A negative electrode active material that the solid electrolyte composition of the embodiment of the invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like. Among these, carbonaceous materials or metal complex oxides are preferably used in terms of reliability. In addition, the metal complex oxides are preferably capable of absorbing and discharging lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), hard carbon, graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

In the present invention, hard carbon and graphite are preferably used.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a $2\theta$ value in a range of 20° to 40° in an X-ray diffraction method in which CuKa rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and discharge of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of absorbing a larger number of Li ions than a carbon negative electrode (graphite, acetylene black, or the like). That is, the amount of Li ions absorbed per unit mass increases. Therefore, it is possible to increase the battery capacity. As a result, there is an advantage that the battery drying duration can be extended.

The shape of the negative electrode active material is not particularly limited, but is preferably a particle shape. The average particle diameter of the negative electrode active material is preferably 0.1 µm to 60 µm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 80% by mass and more preferably 20% to 80% by mass with respect to a solid component of 100% by mass.

The surfaces of the positive electrode active material and/or the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium niobate-based compounds, and the like, and specific examples thereof include $Li_4Ti_5O_{12}$, $Li2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

(Binder)

The solid electrolyte composition of the embodiment of the invention may further contain a binder as a polymer component.

The binder that is used in the present invention is not particularly limited as long as the binder is an organic polymer.

A binder that can be used in the present invention is not particularly limited, and, for example, a binder made of a resin described below is preferred.

Examples of fluorine-containing resins include polytetrafluoroethylene (PTFE), polyvinylidene difluoride (PVdF), and copolymers of polyvinylidene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, and polyisoprene.

Examples of acrylic resins include a variety of (meth)acrylic monomers, (meth)acrylic amide monomers, and copolymers of monomers constituting these resins.

In addition, copolymers with other vinyl-based monomers are also preferably used. Examples thereof include copolymers of poly(methyl (meth)acrylate) and polystyrene, copolymers of poly(methyl (meth)acrylate) and acrylonitrile, and copolymers of poly(butyl (meth)acrylate), acrylonitrile, and styrene.

Examples of other resins include a polyurethane resin, a polyurea resin, a polyamide resin, a polyimide resin, a polyester resin, a polyether resin, a polycarbonate resin, a cellulose derivative resin, and the like.

These binders may be used singly or two or more binders may be used in combination.

The shape of the binder is not particularly limited and may be a particle shape or an irregular shape in an all-solid state battery.

The moisture concentration of a polymer constituting the binder that is used in the present invention is preferably 100 ppm (mass-based) or less.

In addition, the polymer constituting the binder that is used in the present invention may be used in a solid state or may be used in a state of a polymer particle dispersion liquid or a polymer solution.

The mass-average molecular weight of the polymer constituting the binder that is used in the present invention is preferably 10,000 or more, more preferably 20,000 or more, and still more preferably 30,000 or more. The upper limit is preferably 1,000,000 or less, more preferably 200,000 or less, and still more preferably 100,000 or less.

In a case in which a favorable decreasing property of the interface resistance and the maintaining property thereof in the case of being used in the all-solid state secondary battery are taken into account, the content of the binder in the solid electrolyte composition is preferably 0.01% by mass or more, more preferably 0.1% by mass or more, and still more preferably 1% by mass or more with respect to 100% by mass of the solid component. From the viewpoint of battery characteristics, the upper limit is preferably 10% by mass or less, more preferably 5% by mass or less, and still more preferably 3% by mass or less.

In the present invention, the mass ratio of the total mass (total amount) of the inorganic solid electrolyte and the active material to the mass of the binder [(the mass of the inorganic solid electrolyte and the mass of the active material)/the mass of the binder] is preferably in a range of 1,000 to 1. Furthermore, this ratio is more preferably 500 to 2 and still more preferably 100 to 10.

(Dispersant)

The solid electrolyte composition of the embodiment of the invention may also contain a dispersant. The addition of the dispersant enables the suppression of the agglomeration of the electrode active material and the inorganic solid electrolyte even in a case in which the concentration of any of the electrode active material and the inorganic solid electrolyte is high or a case in which the particle diameters are small and the surface area increases and the formation of a uniform active material layer and a uniform solid electrolyte layer. As the dispersant, a dispersant that is ordinarily used for an all-solid state secondary battery can be appropriately selected and used. Generally, a compound intended for particle adsorption and steric repulsion and/or electrostatic repulsion is preferably used.

(Conductive Auxiliary Agent)

The solid electrolyte composition of the embodiment of the invention may also contain a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, these conductive auxiliary agents may be used singly or two or more conductive auxiliary agents may be used.

(Preparation of Solid Electrolyte Composition)

Hereinafter, an example of a method for preparing the solid electrolyte composition of the embodiment of the invention will be described.

First, the multibranched polymer and the salt of the metal belonging to Group I or II of the periodic table which are used in the present invention are dispersed I the above-described dispersion medium (for example, acetonitrile) and stirred at 20° C. to 60° C. for 5 to 120 minutes. Subsequently, the components are dried at reduced pressure, thereby obtaining a polymer composition including the multibranched polymer and the salt of the metal belonging to Group I or II of the periodic table.

Next, the inorganic solid electrolyte and the polymer composition prepared above are dispersed in the presence of a dispersion medium to produce a slurry, whereby the solid electrolyte composition can be prepared.

The slurry can be produced by mixing the inorganic solid electrolyte, the polymer composition, and the dispersion medium using a variety of mixers. The mixing device is not particularly limited, and examples thereof include a ball mill, a beads mill, a planetary mixer, a blade mixer, a roll mill, a kneader, and a disc mill. The mixing conditions are not particularly limited; however, in the case of using a ball mill, the inorganic solid electrolyte and the dispersion medium are preferably mixed together at 150 to 700 rpm (rotation per minute) for one hour to 24 hours.

In the case of preparing a solid electrolyte composition containing components such as an active material and a particle dispersant, the components may be added and mixed at the same time as a dispersion step of the inorganic solid electrolyte and the polymer composition or may be separately added and mixed.

[Sheet for All-Solid State Secondary Battery]

The sheet for an all-solid state secondary battery of the embodiment of the invention can be preferably used in all-solid state secondary batteries and is modified in a variety of aspects depending on the uses. Examples thereof include a sheet having a solid electrolyte layer on a base material (also referred to as a solid electrolyte sheet for an all-solid state secondary battery), a sheet having an electrode active material layer or an electrode active material layer and a solid electrolyte layer on a base material (an electrode sheet for an all-solid state secondary battery), a sheet formed of a solid electrolyte layer and/or an active material layer (electrode layer) (a sheet not having a base material), and the like. In the present specification, a variety of sheets described above will be collectively referred to as a sheet for an all-solid state secondary battery in some cases.

The sheet for an all-solid state secondary battery is a sheet having a solid electrolyte layer or an active material layer (electrode layer). This sheet for an all-solid state secondary battery may further have other layers as long as the sheet has the solid electrolyte layer or the active material layer, but a sheet containing an active material is classified into an electrode sheet for an all-solid state secondary battery described below. Examples of other layers include a protective layer, a collector, a coating layer (a collector, a solid electrolyte layer, or an active material layer), and the like.

Examples of the solid electrolyte sheet for an all-solid state secondary battery include a sheet having a solid electrolyte layer and a protective layer on a base material in this order.

The base material is not particularly limited as long as the base material is capable of supporting the solid electrolyte layer, and examples thereof include sheet bodies (plate-like bodies) of materials, organic materials, inorganic materials, and the like described in the section of the collector described below. Examples of the organic materials include a variety of polymers and the like, and specific examples thereof include polyethylene terephthalate, polypropylene, polyethylene, cellulose, and the like. Examples of the inorganic materials include glass, ceramic, and the like.

The layer thickness of the solid electrolyte layer in the sheet for an all-solid state secondary battery is identical to the layer thickness of the solid electrolyte layer described in the section of an all-solid state secondary battery of the embodiment of the invention.

This sheet is obtained by forming a film of the solid electrolyte composition of the embodiment of the invention (by means of application and drying) on the base material (possibly, through other layers) and forming a solid electrolyte layer on the base material.

Here, the solid electrolyte composition of the embodiment of the invention can be prepared using for example, the above-described method.

An electrode sheet for an all-solid state secondary battery of the embodiment of the invention (also simply referred to as "the electrode sheet") is an electrode sheet having an active material layer on a metal foil as a collector for forming an active material layer in an all-solid state secondary battery of the embodiment of the invention. This electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet.

The constitution and the layer thicknesses of the respective layers constituting the electrode sheet are identical to the constitution and the layer thicknesses of individual layers described in the section of an all-solid state secondary battery of the embodiment of the invention.

The electrode sheet is obtained by forming a film of the solid electrolyte composition of the embodiment of the invention which contains the active material (by means of application and drying) on the metal foil and forming an active material layer on the metal foil. A method for preparing the solid electrolyte composition containing an active material is identical to the method for preparing the solid electrolyte composition except for the fact that the active material is used.

[All-Solid State Secondary Battery]

An all-solid state secondary battery of the embodiment of the invention has a positive electrode, a negative electrode facing the positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer, the positive electrode active material layer, or the solid electrolyte layer is formed using the solid electrolyte composition of the embodiment of the invention.

The kinds and the content ratio of the components of the active material layers and/or the solid electrolyte layer formed of the solid electrolyte composition are preferably identical to those in the solid content of the solid electrolyte composition.

Meanwhile, the sheet for an all-solid state secondary battery may contain a dispersion medium as long as the battery performance is not affected. Specifically, the content thereof may be 1 ppm or more and 10,000 ppm or less of the total mass.

Meanwhile, the content proportion of the dispersion medium in the sheet for an all-solid state secondary battery of the embodiment of the invention can be measured using the following method.

A 20 mm×20 mm specimen is cut out from the sheet for an all-solid state secondary battery by punching and immersed in heavy tetrahydrofuran in a glass bottle. The obtained eluted substance is filtered using a syringe filter, and a quantitative operation by $^1$H-NMR is carried out. The correlation between the $^1$H-NMR peak surface area and the amount of the solvent is obtained by producing a calibration curve.

Hereinafter, a preferred embodiment of the present invention will be described with reference to FIG. 1, but the present invention is not limited thereto.

[Positive Electrode Active Material Layer, Solid Electrolyte Layer, and Negative Electrode Active Material Layer]

In the all-solid state secondary battery 10, at least one of a positive electrode active material layer 4, a solid electrolyte layer 3, or a negative electrode active material layer 2 is formed using the solid electrolyte composition of the embodiment of the invention.

That is, in a case in which the solid electrolyte layer 3 is formed of the solid electrolyte composition of the embodiment of the invention, the solid electrolyte layer 3 includes the inorganic solid electrolyte, a salt of a metal belonging to Group I or II of the periodic table, and a multibranched polymer. The solid electrolyte layer, generally, does not include any positive electrode active material and/or any negative electrode active material.

In a case in which the positive electrode active material layer 4 and/or the negative electrode active material layer 2 are formed using the solid electrolyte composition of the embodiment of the invention, the positive electrode active material layer 4 and the negative electrode active material layer 2 respectively include a positive electrode active material or a negative electrode active material and further include the inorganic solid electrolyte, an ion of a metal belonging to Group I or II of the periodic table, and a multibranched polymer. In a case in which the active material layers contain the inorganic solid electrolyte, it is possible to improve the ion conductivity.

The kinds of the inorganic solid electrolytes and the multibranched polymer that the positive electrode active material layer 4, the solid electrolyte layer 3, and the negative electrode active material layer 2 contain may be identical to or different from each other.

In the present invention, any layer of the negative electrode active material layer, the positive electrode active material layer, and the solid electrolyte layer in the all-solid state secondary battery is produced using the solid electrolyte composition containing the salt of a metal belonging to Group I or II of the periodic table, and the multibranched polymer, and the solid particles such as the inorganic solid electrolyte. Therefore, it is possible to improve the bonding property between solid particles, and consequently, favorable cycle characteristics of the all-solid state secondary battery can also be realized.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be composed of a single layer or multiple layers.

[Chassis]

It is possible to produce the basic structure of the all-solid state secondary battery by disposing the respective layers described above. Depending on the use, the basic structure may be directly used as an all-solid state secondary battery, but the basic structure may be used after being enclosed in an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

[Manufacturing of Sheet for All-Solid State Secondary Battery]

The sheet for an all-solid state secondary battery of the embodiment of the invention is obtained by forming a film of the solid electrolyte composition of the embodiment of the invention on a base material (possibly, through a different layer) (application and drying) and forming a solid electrolyte layer on the base material.

With the above-described aspect, it is possible to produce a sheet for an all-solid state secondary battery which is a sheet having a base material and a solid electrolyte layer.

Additionally, regarding steps such as application, it is possible to use a method described in the following section of the manufacturing of an all-solid state secondary battery.

[All-Solid State Secondary Battery and Manufacturing of Electrode Sheet for All-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the embodiment of the invention or the like. Hereinafter, the manufacturing method will be described in detail.

The all-solid state secondary battery of the embodiment of the invention can be manufactured using a method including (through) a step of applying the solid electrolyte composition of the embodiment of the invention onto a metal foil which serves as a collector and forming a coated film (film manufacturing).

For example, a solid electrolyte composition containing a positive electrode active material is applied as a material for a positive electrode (a composition for a positive electrode) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent total performance is exhibited, and it is possible to obtain a favorable bonding property.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the applied solvent or dispersion medium has been dried in advance or in a state in which the solvent or the dispersion medium remains.

Meanwhile, the respective compositions may be applied at the same time, and the application, the drying, and the pressing may be carried out simultaneously and/or sequentially. The respective compositions may be applied to separate base materials and then laminated by means of transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the same portion with a pressure that varies stepwise.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of All-Solid State Secondary Battery]

The all-solid state secondary battery of the embodiment of the invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric vehicles and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

According to the preferred embodiment of the present invention, individual application forms as described below are derived.

[1] All-solid state secondary batteries in which at least one layer of a positive electrode active material layer, a solid electrolyte layer, or a negative electrode active material layer contains a conductive auxiliary agent.

[2] Methods for manufacturing an all-solid state secondary battery in which a solid electrolyte layer is formed by applying a slurry including a conductive auxiliary agent and a sulfide-based inorganic solid electrolyte dispersed using a dispersion medium in a wet manner.

[3] Solid electrolyte compositions containing an active material for producing the all-solid state secondary battery.

[4] Electrode sheets for an all-solid state secondary battery obtained by applying the solid electrolyte composition onto a metal foil to form a film.

[5] Methods for manufacturing an electrode sheet for an all-solid state secondary battery in which the solid electrolyte composition is applied onto a metal foil, thereby forming a film.

[6] All-solid state secondary batteries in which at least one layer of a solid electrolyte layer or a negative electrode active material layer is formed of the solid electrolyte composition of the embodiment of the invention.

As described in the preferred embodiments [2] and [5], preferred methods for manufacturing the all-solid state secondary battery and the electrode sheet for an all-solid state secondary battery according to the embodiment of the invention are all wet-type processes. Therefore, even in a region in at least one layer of the positive electrode active material layer or the negative electrode active material layer in which the content of the inorganic solid electrolyte is as low as 10% by mass or less, the adhesiveness between the active material and the inorganic solid electrolyte, an efficient ion conduction path can be maintained, and it is possible to manufacture an all-solid state secondary battery having a high energy density (Wh/kg) and a high output density (W/kg) per battery mass.

All-solid state secondary batteries refer to secondary batteries having a positive electrode, a negative electrode, and an electrolyte which are all composed of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (high-molecular-weight) all-solid state secondary batteries in which a high-molecular-weight compound such as polyethylene oxide is used as an electrolyte and inorganic all-solid state secondary batteries in which the Li-P-S-based glass, LLT, LLZ, or the like is used. Meanwhile, the application of organic compounds to inorganic all-solid state secondary batteries is not inhibited, and organic compounds can also be applied as binders or additives of positive electrode active materials, negative electrode active materials, and inorganic solid electrolytes.

Inorganic solid electrolytes are differentiated from electrolytes in which the above-described high-molecular-weight compound is used as an ion conductive medium (high-molecular-weight electrolyte), and inorganic compounds serve as ion conductive media. Specific examples thereof include the Li-P-S-based glass, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include LiTFSI.

In the present invention, "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described.

<Synthesis Example of Polymer>
(Synthesis of Multibranched Polymer PA-1)
A monomer 1 of an arm portion-forming compound shown in Table 1 (methoxy polyethylene glycol acrylate (number-average molecular weight: 450) (manufactured by Aldrich-Sigma, Co. LLC.)) (33.0 g), a core-forming compound C-1 shown in Table 1 (pentaerythritol tetrakis(3-mercaptopropionate) (manufactured by Wako Pure Chemical Industries, Ltd.)) (1.5 g), and methyl ethyl ketone (70.0 g) were added to a 200 mL three-neck flask equipped with a reflux cooler and a gas introduction coke, and nitrogen substitution was carried out twice. Subsequently, 2,2'-azobis(2,4-dimethylvaleronitrile) (trade name: V-65, manufactured by Wako Pure Chemical Industries, Ltd.) (3.0 g) was added thereto as a polymerization initiator, furthermore, nitrogen substitution was carried out twice, and the components were heated at 70° C. for three hours under a nitrogen steam. The heating was continued until the disappearance of a residual monomer-derived peak and the disappearance of a thiol hydrogen peak that was the core portion were confirmed by NMR. A petroleum ether was added thereto, and solid was precipitated, thereby obtaining a multibranched polymer PA-1 (yield: 20.1 g).

(Synthesis of Multibranched Polymer PA-5)
A core-forming compound C-4 shown in Table 2 (butanetetracarboxylic acid (manufactured by Tokyo Chemical Industry Co., Ltd.)) (1.2 g), an arm portion-forming compound shown in Table 2 (polyethylene glycol monomethyl ether (number-average molecular weight: 5,000) (manufactured by Aldrich-Sigma, Co. LLC.)) (120 g), and tetrahydrofuran (500 g) were added to a 1,000 mL three-neck flask equipped with a reflux cooler and a dropping funnel, and nitrogen substitution was carried out twice. A mixed solution of separately-prepared EDCl/HCl (1-ethyl-3-3-dimethylaminopropylcarbodiimide) hydrochloride (manufactured by Tokyo Chemical Industry Co., Ltd.) (4.3 g), triethylamine (2.4 g), and tetrahydrofuran (50 g) was moved to the dropping funnel, and the full amount thereof was added dropwise to the three-neck flask for one hour.

After the dropwise addition, the components were heated at 50° C. for 12 hours, and the reaction was stopped after the disappearance of the butanetetracarboxylic acid-derived peak was confirmed by NMR. After the end of the reaction, a petroleum ether was added thereto, and solid was precipitated, thereby obtaining a multibranched polymer PA-5 (yield: 100 g).

(Synthesis of Multibranched Polymer PA-7)
A 500 mL three-neck flask equipped with a reflux cooler and a dropping funnel was substituted with nitrogen, pentaerythritol (manufactured by Aldrich-Sigma, Co. LLC.) (1.2 g), diethoxyethane (50 g), and NaH (0.4 g) were added thereto, and the components were heated at 80° C. for two hours. Valerolactone (30 g) was moved to the dropping funnel, and the full amount thereof was added dropwise for four hours in a state of being heated at 100° C. After the dropwise addition, the components were heated at 100° C. for 12 hours, the disappearance of the raw material-derived peak was confirmed, then, a petroleum ether was added thereto, and solid was precipitated, thereby obtaining PA-7 (yield: 10 g).

(Synthesis of Multibranched Polymer PA-8)
A 100 mL three-neck flask equipped with a reflux cooler and a dropping funnel was substituted with nitrogen, dipentaerythritol (manufactured by Aldrich-Sigma, Co. LLC.) (0.02 g), diethoxyethane (10 g), and NaH (0.01 g) were added thereto, and the components were heated at 80° C. for two hours. Polypropylene carbonate (manufactured by Aldrich-Sigma, Co. LLC.) (10 g) and diethoxyethane (50 g) were measured and stirred in the three-neck flask, and the full amount thereof was added to the three-neck flak heated at 100° C. for four hours. After the dropwise addition, the components were heated at 100° C. for 12 hours, the disappearance of the peak derived from a hydroxyl group of dipentaerythritol was confirmed, then, a petroleum ether was added thereto, and solid was precipitated, thereby obtaining PA-8 (yield: 5.8 g).

Multibranched polymers PA-2, PA-3, PA-4, PA-6, and PA-9 to PA-12 shown in Table 1 or 2 were synthesized in the same manner as any of the above-described synthesis methods.

The preparation ratios and the measured molecular weights of compounds used to synthesize the above-described multibranched polymers are summarized in Tables 1 and 2. Meanwhile, "polymer molecular weight" and "arm portion molecular weight" were measured from the compounds used for the syntheses using the above-described method. The preparation ratios of the respective compounds correspond to the mass ratio between the arm portion and the core portion of the synthesized multibranched polymer.

TABLE 1

| Multibranched polymer | Arm portion-forming compound | | | | Core-forming compound | | Polymer molecular weight | Arm portion molecular weight | Core portion molecular weight |
| | Monomer 1 | | Monomer 2 | | | | | | |
| | Kind | % by mass | Kind | % by mass | Kind | % by mass | | | |
|---|---|---|---|---|---|---|---|---|---|
| PA-1 | Methoxy polyethylene glycol acrylate | 96 | — | — | C-1 | 4 | 11000 | 2500 | 480 |
| PA-2 | Methoxy polyethylene glycol acrylate | 98 | — | — | C-1 | 2 | 18000 | 4300 | 480 |
| PA-3 | Methoxy polyethylene glycol acrylate | 92 | Vinylethylene carbonate | 3 | C-2 | 5 | 10000 | 1500 | 770 |
| PA-4 | Methoxy propylene glycol acrylate | 94 | — | — | C-3 | 6 | 20000 | 2400 | 1000 |

TABLE 2

| Multibranched polymer | Arm portion-forming compound Kind | % by mass | Core-forming compound Kind | % by mass | Polymer molecular weight | Arm portion molecular weight | Core portion molecular weight |
|---|---|---|---|---|---|---|---|
| PA-5 | Polyethylene glycol monomethyl ether (terminal OH) | 99 | C-4 | 1 | 26000 | 5000 | 230 |
| PA-6 | Polyethylene glycol monomethyl ether (terminal OH) | 99 | C-5 | 1 | 25000 | 5000 | 140 |
| PA-7 | Polybutyl ester | 96 | C-5 | 4 | 8000 | 1500 | 140 |
| PA-8 | Polypropylene carbonate | 96 | C-8 | 4 | 200000 | 50000 | 250 |
| PA-9 | Polyethylene glycol monomethyl ether (terminal OH) | 99 | C-6 | 1 | 20000 | 5000 | 160 |
| PA-10 | Polyethylene glycol monomethyl ether (terminal OH) | 99 | C-7 | 1 | 19000 | 5000 | 150 |
| PA-11 | Polyethylene glycol monomethyl ether (terminal OH) | 99.5 | C-8 | 0.5 | 35000 | 5000 | 250 |
| PA-12 | Polyethylene glycol monomethyl ether (terminal OH) | 99.5 | C-9 | 0.5 | 55000 | 5000 | 880 |

<Notes of Table>

Polymer molecular weight: The mass-average molecular weight of the multibranched polymer Arm portion molecular weight: The mass-average molecular weight of the arm portion of the multibranched polymer Core portion molecular weight: The molecular weight of the core portion of the multibranched polymer C-1 to C-9: Compounds illustrated below (C-4' to C-9' described below represent the structures of core portions derived from C-4 to C-9. The broken-line portion represents a bonding site in the multibranched polymer.)

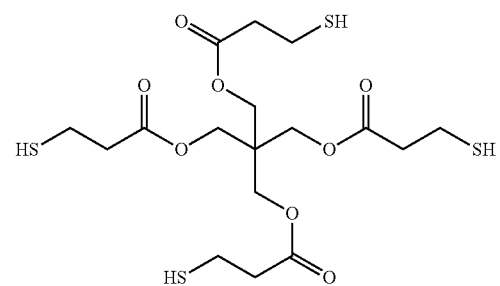

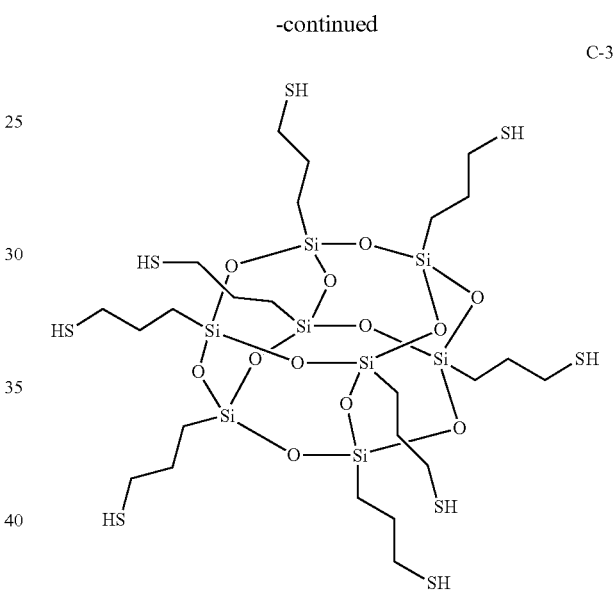

C-7
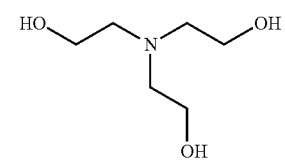

C-8
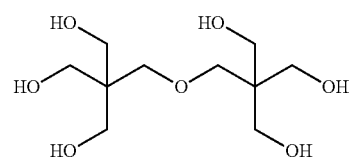

C-9
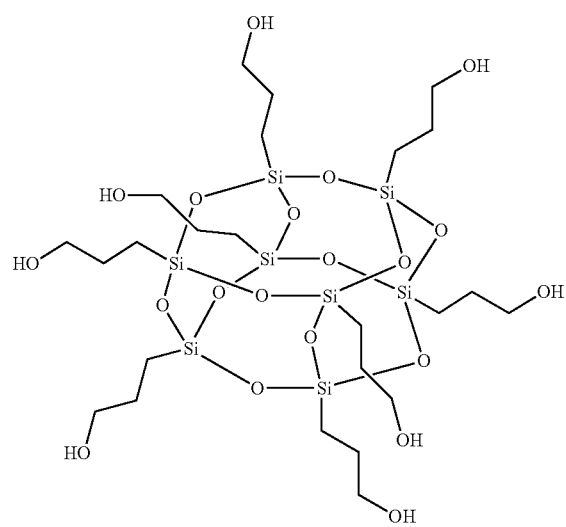

C'-4
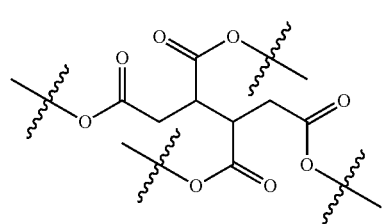

C'-5
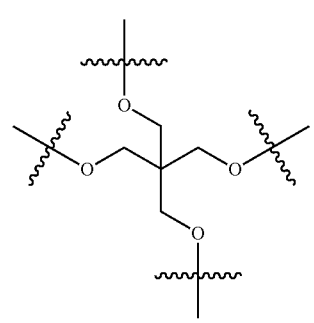

C'-6
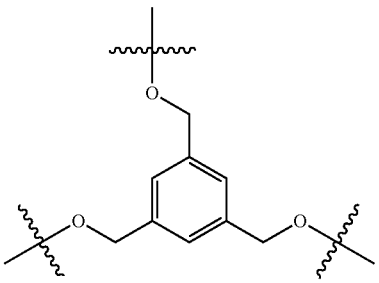

C'-7
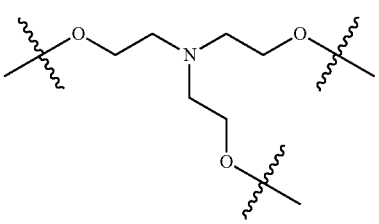

C'-8
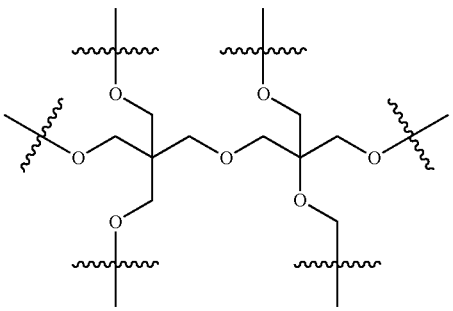

C'-9
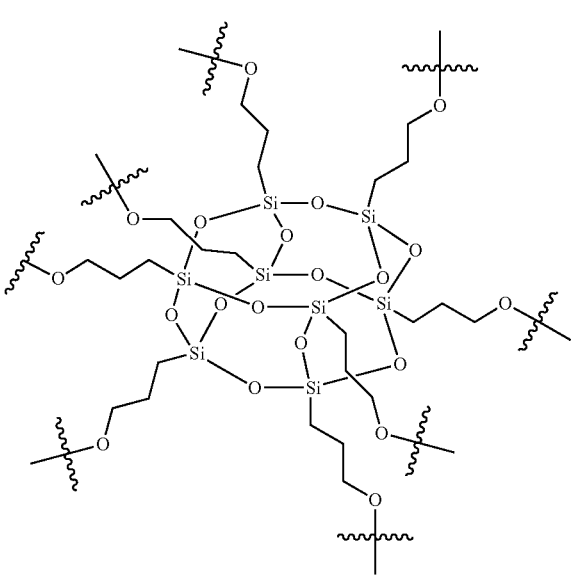

<Preparation Example of Polymer Composition>

(1) Preparation of polymer composition PA-1

A rotator was injected into a 200 mL eggplant flask in a dried atmosphere (dew point: −40° C.), and the multi-branched polymer synthesized above PA-1 (8.0 g) and LiTFSI (2.0 g) were weighed and added thereto. Subsequently, dehydrated acetonitrile (100 mL) was added thereto, and the components were heated at 40° C. and stirred for 60 minutes, thereby obtaining a polymer liquid.

The polymer liquid was caused to flow onto an aluminum pan and dried at reduced pressure at 80° C. for two hours, thereby preparing a polymer composition LPA-1.

The fact that the peak of the LiTFSI salt was shifted to a high magnetic field was confirmed by $^7$Li-NMR measurement, and the fact that the peak relating to an ethylene oxide of PA-1 was shifted to a low magnetic field was confirmed by $^1$H-NMR. Therefore, it was confirmed that a lithium ion was dissolved in the arm portion of the multibranched polymer.

(2) Preparation of polymer compositions LPA-2 to 14 and LEX-1 to 4

Polymer compositions LPA-2 to 14 and LEX-1 to 4 were prepared using the same method as for the polymer composition LPA-1 except for the fact that the composition was changed as shown in Table 3.

TABLE 3

| Polymer composition | Multibranched polymer | % by mass | Metal salt | % by mass |
|---|---|---|---|---|
| LPA-1 | PA-1 | 80 | LiTFSI | 20 |
| LPA-2 | PA-2 | 80 | LiFSI | 20 |
| LPA-3 | PA-3 | 80 | LiTFS | 20 |
| LPA-4 | PA-4 | 80 | LiBETI | 20 |
| LPA-5 | PA-5 | 80 | LiTFSI | 20 |
| LPA-6 | PA-5 | 60 | LiTFSI | 40 |
| LPA-7 | PA-6 | 80 | LiBOB | 20 |
| LPA-8 | PA-7 | 80 | LiTFSI | 20 |
| LPA-9 | PA-8 | 80 | LiFSI | 20 |
| LPA-10 | PA-9 | 80 | LiFSI | 20 |
| LPA-11 | PA-10 | 80 | LiTFSI | 20 |
| LPA-12 | PA-11 | 80 | LiTFSI | 20 |
| LPA-13 | PA-12 | 80 | LiFSI | 20 |
| LPA-14 | PA-11 | 40 | LiTFSI | 60 |
| LEX-1 | EX-1 | 100 | — | — |
| LEX-2 | EX-2 | 100 | — | — |
| LEX-3 | EX-1 | 85 | LiTFSI | 15 |
| LEX-4 | EX-2 | 80 | LiTFSI | 20 |

<Synthesis Example of Sulfide-Based Inorganic Solid Electrolyte>

Synthesis of Li-P-S-based Glass

As a sulfide-based inorganic solid electrolyte, Li-P-S-based glass was synthesized with reference to a non-patent document of T. Ohtomo, A. Hayashi, M. Tatsumisago, Y. Tsuchida, S. HamGa, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using an agate muddler for five minutes. The mixing ratio between $Li_2S$ and $P_2S_5$ was set to 75:25 in terms of molar ratio.

Zirconia beads (66 g) having a diameter of 5 mm were injected into a 45 mL zirconia container (manufactured by Fritsch Japan Co., Ltd.), the full amount of the mixture of the lithium sulfide and the diphosphorus pentasulfide was injected thereinto, and the container was completely sealed in an argon atmosphere. The container was set in a planetary ball mill P-7 (trade name, manufactured by Fritsch Japan Co., Ltd.), mechanical milling was carried out at a temperature of 25° C. and a rotation speed of 510 rpm for 20 hours, thereby obtaining yellow powder (6.20 g) of a sulfide-based inorganic solid electrolyte (Li-P-S-based glass, expressed as LPS in some cases).

Example 1

<Preparation Examples of Solid Electrolyte Composition>

(1) Preparation of Solid Electrolyte Composition S-1

One hundred eighty zirconia beads having a diameter of 5 mm were injected into a 45 mL zirconia container (manufactured by Fritsch Japan Co., Ltd.), the sulfide-based inorganic solid electrolyte Li-P-S-based glass synthesized above (9.7 g), a polymer composition shown in Table 4 (0.3 g) as a binder, and a solvent mixture (15 g) of heptane (90 g) and dibutyl ether (10 g) as a dispersion medium were injected thereinto. After that, the container was set in a planetary ball mill P-7 (trade name, manufactured by Fritsch Japan Co., Ltd.), and the components were continuously stirred at a temperature of 25° C. and a rotation speed of 300 rpm for two hours. A solid electrolyte composition S-1 was prepared in the above-described manner.

(2) Preparation of solid electrolyte compositions S-2 to S-14 and T-1 to T-5 —

Solid electrolyte compositions S-2 to S-14 and T-1 to T-5 were prepared using the same method as for the solid electrolyte composition S-1 except for the fact that the compositions were changed as shown in Table 4.

Here, the solid electrolyte compositions S-1 to S-14 are the solid electrolyte composition of the embodiment of the invention, and the solid electrolyte compositions T-1 to T-5 are comparative solid electrolyte compositions.

TABLE 4

| Composition | Inorganic solid electrolyte | % by mass | Polymer composition | % by mass |
|---|---|---|---|---|
| S-1 | LPS | 97 | LPA-1 | 3 |
| S-2 | LPS | 95 | LPA-2 | 5 |
| S-3 | LPS | 93 | LPA-3 | 7 |
| S-4 | LPS | 97 | LPA-4 | 3 |
| S-5 | LPS | 97 | LPA-5 | 3 |
| S-6 | LPS | 97 | LPA-6 | 3 |
| S-7 | LPS | 97 | LPA-7 | 3 |
| S-8 | LPS | 97 | LPA-8 | 3 |
| S-9 | LPS | 97 | LPA-9 | 3 |
| S-10 | LPS | 97 | LPA-10 | 3 |
| S-11 | LPS | 97 | LPA-11 | 3 |
| S-12 | LPS | 97 | LPA-12 | 3 |
| S-13 | LPS | 97 | LPA-13 | 3 |
| S-14 | LPS | 97 | LPA-14 | 3 |
| T-1 | LPS | 97 | LEX-1 | 3 |
| T-2 | LPS | 97 | LEX-2 | 3 |
| T-3 | LPS | 97 | LEX-3 | 3 |
| T-4 | LPS | 97 | LEX-4 | 3 |
| T-5 | LPS | 100 | — | — |

<Preparation Examples of Composition for Positive Electrode>

(1) Preparation of composition for positive electrode AS-1

Fifty zirconia beads having a diameter of 3 mm were injected into a 45 mL zirconia container (manufactured by Fritsch Japan Co., Ltd.), and the solid electrolyte composition S-1 prepared above (2 g) was added thereto. A positive electrode active material LCO (3 g) was added thereto, and then the container was set in a planetary ball mill P-7 (manufactured by Fritsch Japan Co., Ltd.), and the components were continuously stirred at a temperature of 25° C. and a rotation speed of 100 rpm for 15 minutes, thereby preparing a composition for a positive electrode AS-1.

(2) Preparation of compositions for positive electrode AS-6, AS-13, AT-2, AT-4, and AT-5.

Compositions for a positive electrode AS-6, AS-13, AT-2, AT-4, and AT-5 were prepared using the same method as for the composition for a positive electrode AS-1 except for the fact that the composition was changed as shown in Table 5.

The compositions of the compositions for a positive electrode are summarized in Table 5.

Here, the compositions for a positive electrode AS-1, AS-6, and AS-13 are the solid electrolyte composition of the embodiment of the invention, and the compositions for a positive electrode AT-2, AT-4, and AT-5 are comparative solid electrolyte compositions.

TABLE 5

| Composition for positive electrode | Positive electrode active material | % by mass | Solid electrolyte composition | % by mass |
|---|---|---|---|---|
| AS-1 | LCO | 60 | S-1 | 40 |
| AS-6 | NMC | 60 | S-6 | 40 |
| AS-13 | NMC | 60 | S-13 | 40 |
| AT-2 | LCO | 60 | T-2 | 40 |
| AT-4 | NMC | 60 | T-4 | 40 |
| AT-5 | NMC | 60 | T-5 | 40 |

<Preparation Examples of Composition for Negative Electrode>

(1) Preparation of composition for negative electrode BS-1

Fifty zirconia beads having a diameter of 3 mm were injected into a 45 mL zirconia container (manufactured by Fritsch Japan Co., Ltd.), and the solid electrolyte composition S-1 prepared above (2 g) was added thereto. Graphite (3 g) was added thereto as a negative electrode active material, and then the container was set in a planetary ball mill P-7 (manufactured by Fritsch Japan Co., Ltd.), and the components were continuously stirred at a temperature of 25° C. and a rotation speed of 100 rpm for 15 minutes, thereby preparing a composition for a negative electrode BS-1.

(2) Preparation of compositions for negative electrode BS-2 to BS-14 and BT-1 to BT-5

Compositions for a negative electrode BS-2 to BS-14 and BT-1 to BT-5 were prepared using the same method as for the composition for a negative electrode BS-1 except for the fact that the composition was changed as shown in Table 6.

The compositions of the compositions for a negative electrode are summarized in Table 6.

Here, the compositions for a negative electrode BS-1 to BS-14 are the solid electrolyte composition of the embodiment of the invention, and the compositions for a negative electrode BT-1 to BT-5 are comparative solid electrolyte compositions.

TABLE 6

| Composition for negative electrode | Negative electrode active material | % by mass | Electrolyte | % by mass |
|---|---|---|---|---|
| BS-1 | Graphite | 60 | S-1 | 40 |
| BS-2 | Hard carbon | 60 | S-2 | 40 |
| BS-3 | Graphite | 60 | S-3 | 40 |
| BS-4 | Graphite | 60 | S-4 | 40 |
| BS-5 | Graphite | 60 | S-5 | 40 |
| BS-6 | Hard carbon | 60 | S-6 | 40 |
| BS-7 | Graphite | 60 | S-7 | 40 |
| BS-8 | Graphite | 60 | S-8 | 40 |
| BS-9 | Graphite | 60 | S-9 | 40 |
| BS-10 | Hard carbon | 60 | S-10 | 40 |
| BS-11 | Graphite | 60 | S-11 | 40 |
| B5-12 | Graphite | 60 | S-12 | 40 |
| BS-13 | Graphite | 60 | S-13 | 40 |
| BS-14 | Graphite | 60 | S-14 | 40 |
| BT-1 | Graphite | 60 | T-1 | 40 |
| BT-2 | Graphite | 60 | T-2 | 40 |

TABLE 6-continued

| Composition for negative electrode | Negative electrode active material | % by mass | Electrolyte | % by mass |
|---|---|---|---|---|
| BT-3 | Graphite | 60 | T-3 | 40 |
| BT-4 | Graphite | 60 | T-4 | 40 |
| BT-5 | Graphite | 60 | T-5 | 40 |

<Production Examples of All-Solid State Secondary Battery>

(1) Production of All-Solid State Secondary Battery Test No. 101

(Production of All-Solid State Secondary Battery Sheet)

The composition for a positive electrode AT-5 prepared above was applied onto a 20 μm-thick aluminum foil (collector) using an applicator (trade name: SA-201 Baker type applicator, manufactured by Tester Sangyo Co., Ltd.), heated at 80° C. for one hour, and then further heated at 110° C. for one hour, thereby drying the composition for a positive electrode. After that, the composition for a positive electrode was pressurized (at 180 MPa for one minute) under heating (at 120° C.) using a heat pressing machine, thereby producing a sheet for an all-solid state secondary battery having a laminate structure of a positive electrode active material layer/the aluminum foil. The thickness of the positive electrode active material layer was 90 μm.

Next, the solid electrolyte composition T-5 prepared above was applied onto the obtained positive electrode active material layer using the Baker-type applicator, heated at 80° C. for one hour, and then further heated at 100° C. for one hour, thereby forming a 100 μm-thick solid electrolyte layer.

Next, the composition for a negative electrode BS-1 prepared above was applied onto the obtained solid electrolyte layer using the Baker-type applicator, heated at 80° C. for one hour, and then further heated at 110° C. for one hour, thereby forming a 100 μm-thick negative electrode active material layer. A 20 μm-thick copper foil was overlaid on the negative electrode active material layer and pressurized (at 600 MPa for one minute) under heating at 120° C. using a heat pressing machine, thereby producing an all-solid state secondary battery sheet having a layer constitution illustrated in FIG. 1.

Figure 2:
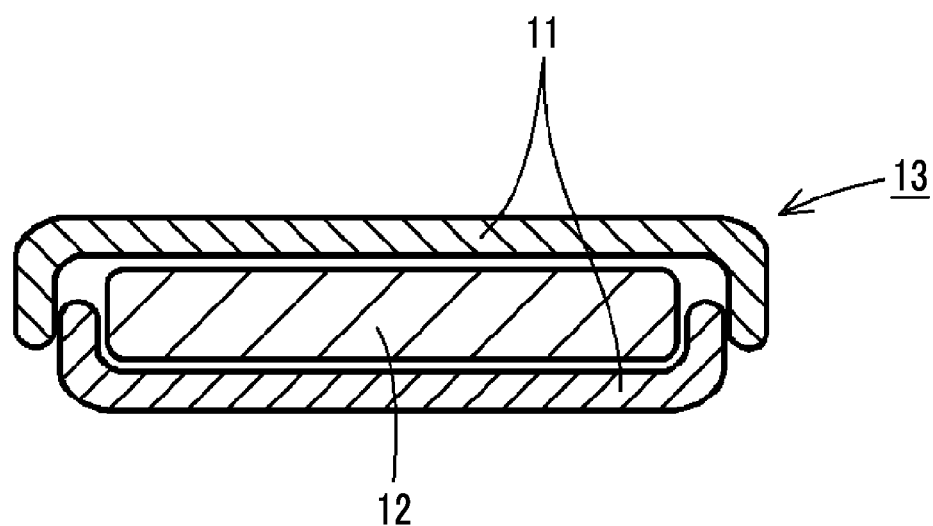
FIG. 2 is a vertical cross-sectional view schematically illustrating a testing device used in examples.

A disc-like piece having a diameter of 14.5 mm was cut out from the all-solid state secondary battery sheet obtained above. The all-solid state secondary battery sheet having a diameter of 14.5 mm which had been cut out to a diameter of 14.5 mm was put into a stainless steel 2032-type coin case 11 illustrated in FIG. 2, into which a spacer and a washer (both are not illustrated in FIG. 2) were combined, and the coin case 11 was swaged, thereby producing an all-solid state secondary battery Test No. 101.

(2) Production of all-solid state secondary batteries Test Nos. 102 to 131 and e101 to e110

All-solid state secondary batteries Test Nos. 102 to 131 and e101 to e110 were produced using the same method for the all-solid state secondary battery Test No. 101 except for the fact that the composition was changed as shown in Table 7.

The content proportions of the dispersion medium in the respective layers were 1 ppm or more and 10,000 ppm or less in the total mass. Meanwhile, the content proportions were measured with reference to the above-described method.

The compositions of the all-solid state secondary batteries are summarized in Table 7.

Here, the all-solid state secondary batteries Test Nos. 101 to 131 are the all-solid state secondary battery of the embodiment of the invention, and the all-solid state secondary batteries Test Nos. e101 to e110 are comparative all-solid state secondary batteries.

<Test>

For the all-solid state secondary batteries produced above, the following three tests were carried out. Hereinafter, testing methods will be described. In addition, the results are summarized in Table 7.

4.2 V Cycle Test

Charging and discharging of 4.2 V to 3.0 V were repeated four times using the all-solid state secondary battery produced above in an environment of 30° C. under conditions of a charging current value of 0.35 mA and a discharging current value of 0.7 mA.

After that, as a cycle test, a test of repeating charging and discharging of 4.2 V to 3.0 V in an environment of 30° C. under a condition of a charging and discharging current value of 0.7 mA was carried out.

The discharge capacity at the first cycle and the discharge capacity at the $100^{th}$ cycle were measured. The discharge capacity retention (%) computed using the following expression is shown in Table 7.

Discharge capacity retention (%)=discharge capacity at $100^{th}$ cycle/discharge capacity at first cycle×100

Evaluation of Presence or Absence of Occurrence of Abnormality

Charging and discharging of 4.2 V to 3.0 V were repeated four times using the all-solid state secondary battery produced above in an environment of 30° C. under conditions of a charging current value of 0.35 mA and a discharging current value of 0.7 mA. After that, charging and discharging in which the all-solid state secondary battery was charged up to 4.2 V in an environment of 0° C. under a condition of a charging current value of 0.7 mA and discharged up to 3.0 V in an environment of 30° C. under a condition of a discharging current value of 0.35 mA was carried out, and the presence or absence of the occurrence of abnormality was evaluated using the following standards. The results are shown in the column of "evaluation of occurrence of abnormality" in Table 7. Meanwhile, in the present test, the evaluation is carried out under stricter conditions than those of an ordinary test of all-solid state secondary battery operation of the related art.

<Evaluation Standards>

A: Out of ten all-solid state secondary batteries, nine or ten all-solid state secondary batteries were charged and discharged without any abnormality.

B: Out of ten all-solid state secondary batteries, seven or eight all-solid state secondary batteries were charged and discharged without any abnormality.

C: Out of ten all-solid state secondary batteries, five or six all-solid state secondary batteries were charged and discharged without any abnormality.

D: Out of ten all-solid state secondary batteries, three or four all-solid state secondary batteries were charged and discharged without any abnormality.

E: Out of ten all-solid state secondary batteries, zero to two all-solid state secondary batteries were charged and discharged without any abnormality.

"Abnormality" refers to the drop of the battery voltage by 0.1 V or more during charging or discharging.

Evaluation of Storage Characteristics During Charging

Charging and discharging of 4.2 V to 3.0 V were repeated four times using the all-solid state secondary battery produced above in an environment of 30° C. under conditions of a charging current value of 0.35 mA and a discharging current value of 0.7 mA. After that, a test of repeating charging and discharging of 4.2 V to 3.0 V five cycles in an environment of 30° C. under a condition of a charging and discharging current value of 0.7 mA was carried out. After that, the all-solid state secondary battery was charged up to 4.2 V in an environment of 30° C. under a condition of a charging current value of 0.35 mA and discharged up to 4.1 V under a condition of a discharging current value of 0.7 mA, and then the all-solid state secondary battery was removed and left to stand in a constant-temperature tank (30° C.) for one week.

After one week, the all-solid state secondary battery was discharged up to 3.0 V in an environment of 30° C. under a condition of a discharging current value of 0.7 mA, charging and discharging of 4.2 V to 3.0 V were carried out under conditions of a charging current value of 0.35 mA and a discharging current value of 0.7 mA, and the discharge capacity value at this time was considered as the discharge capacity after storage.

A deterioration percentage during storage T (%) computed using the following expression was evaluated using the following standards. The results are shown in the column "storage characteristics" in Table 7.

Deterioration percentage during storage T (%)=(discharge capacity value before storage-discharge capacity value after storage)/discharge capacity value before storage×100

<Evaluation Standards>

A: $0 \leq T \leq 15$

B: $15 \leq T \leq 35$

C: $35 < T \leq 50$

D: $50 < T \leq 75$

E: $75 < T \leq 100$

TABLE 7

| Battery No. | Positive electrode layer | Solid electrolyte layer | Negative electrode layer | Evaluation of occurrence of abnormality | Discharge capacity retention (%) | Storage characteristics |
|---|---|---|---|---|---|---|
| 101 | AT-5 | T-5 | BS-1 | A | 88 | A |
| 102 | AT-5 | T-5 | BS-2 | A | 85 | A |
| 103 | AT-5 | T-5 | BS-3 | A | 78 | A |
| 104 | AT-5 | T-5 | BS-4 | A | 70 | A |
| 105 | AT-5 | T-5 | BS-5 | A | 89 | A |
| 106 | AT-5 | T-5 | BS-6 | A | 92 | A |
| 107 | AT-5 | T-5 | BS-7 | A | 89 | A |
| 108 | AT-5 | T-5 | BS-8 | A | 90 | A |
| 109 | AT-5 | T-5 | BS-9 | A | 91 | A |

TABLE 7-continued

| Battery No. | Positive electrode layer | Solid electrolyte layer | Negative electrode layer | Evaluation of occurrence of abnormality | Discharge capacity retention (%) | Storage characteristics |
|---|---|---|---|---|---|---|
| 110 | AT-5 | T-5 | BS-10 | A | 92 | A |
| 111 | AT-5 | T-5 | BS-11 | A | 90 | A |
| 112 | AT-5 | T-5 | BS-12 | A | 93 | A |
| 113 | AT-5 | T-5 | BS-13 | A | 93 | A |
| 114 | AT-5 | T-5 | BS-14 | A | 94 | A |
| 115 | AT-5 | S-1 | BT-5 | A | 86 | A |
| 116 | AT-5 | S-2 | BT-5 | A | 80 | A |
| 117 | AT-5 | S-3 | BT-5 | A | 78 | A |
| 118 | AT-5 | S-4 | BT-5 | A | 78 | A |
| 119 | AT-5 | S-5 | BT-5 | A | 91 | A |
| 120 | AT-5 | S-6 | BT-5 | A | 93 | A |
| 121 | AT-5 | S-7 | BT-5 | A | 88 | A |
| 122 | AT-5 | S-8 | BT-5 | A | 88 | A |
| 123 | AT-5 | S-9 | BT-5 | A | 93 | A |
| 124 | AT-5 | S-10 | BT-5 | A | 94 | A |
| 125 | AT-5 | S-11 | BT-5 | A | 92 | A |
| 126 | AT-5 | S-12 | BT-5 | A | 94 | A |
| 127 | AT-5 | S-13 | BT-5 | A | 94 | A |
| 128 | AT-5 | S-14 | BT-5 | A | 95 | A |
| 129 | AS-1 | S-1 | BT-5 | B | 55 | B |
| 130 | AS-6 | S-5 | BT-5 | B | 60 | B |
| 131 | AS-13 | S-5 | BT-5 | B | 65 | B |
| e101 | AT-5 | T-5 | BT-1 | B | 50 | C |
| e102 | AT-5 | T-5 | BT-2 | E | 15 | E |
| e103 | AT-5 | T-5 | BT-4 | D | 20 | E |
| e104 | AT-5 | T-5 | BT-5 | D | 24 | D |
| e105 | AT-5 | T-1 | BT-5 | B | 45 | B |
| e106 | AT-5 | T-2 | BT-5 | C | 20 | D |
| e107 | AT-5 | T-3 | BT-5 | B | 50 | B |
| e108 | AT-5 | T-4 | BT-5 | D | 40 | D |
| e109 | AT-2 | T-2 | BT-5 | E | 25 | E |
| e110 | AT-4 | T-4 | BT-5 | E | 23 | D |

As is clear from Table 7, all of the all-solid state secondary batteries of the embodiment of the invention exhibited excellent results in the respective tests.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: all-solid state secondary battery sheet
13: all-solid state secondary battery

What is claimed is:

1. A solid electrolyte composition comprising:
   a sulfide-based inorganic solid electrolyte having a conductivity of an ion of a metal belonging to Group I or II of the periodic table;
   a salt of a metal belonging to Group I or II of the periodic table; and
   a multibranched polymer,
   wherein the multibranched polymer has a core portion and at least three arm portions that bond to the core portion, and the arm portion dissolves a metal ion of the salt of the metal belonging to Group I or II of the periodic table,
   wherein the arm portion includes a polymer structure containing at least one repeating unit having an alkylene oxide group, a carbonate group, an ester group, an amide group, or a silicone group, and
   wherein the repeating unit is a repeating unit represented by Formula (A),

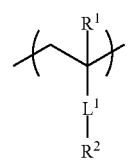

Formula (A)

in the formula, $R^1$ represents a hydrogen atom, a halogen atom, a cyano group, an alkyl group, an alkoxy group, or an aryl group, $R^2$ represents a hydrogen atom, a halogen atom, a cyano group, an alkyl group, an alkoxy group, or an aryl group, and $L^1$ represents a divalent linking group including at least one of an alkylene oxide group, a carbonate group, an ester group, an amide group, or a silicone group.

2. The solid electrolyte composition according to claim 1, wherein a main chain of the polymer structure constituting the arm portion is constituted by including an alkylene oxide group, a carbonate group, and/or an ester group.

3. The solid electrolyte composition according to claim 1, wherein a mass-average molecular weight of the arm portion is 500 or more and 1,000,000 or less.

4. The solid electrolyte composition according to claim 1, wherein the multibranched polymer is represented by Formula (B),

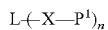   Formula (B)

in the formula, L represents an n-valent linking group, $P^1$ represents a polymer chain, n represents an integer of 3 or more, $nP^1$'s may be identical to or different from each other, $L-(X)_n$ forms the core portion, $(P^1)_n$ forms the arm portion, X represents an oxygen atom, a sulfur atom, or $-N(R^3)-$, and $R^3$ represents a hydrogen atom, an alkyl group, or an aryl group.

5. The solid electrolyte composition according to claim 1, wherein the core portion has a partial structure represented by any of the following formulae,

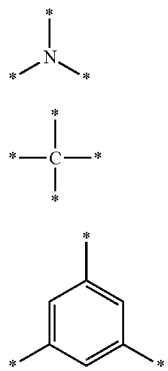

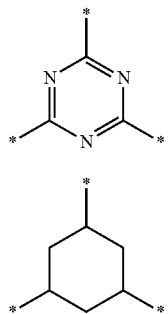

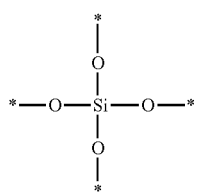

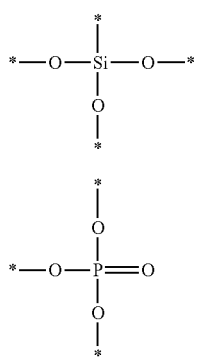

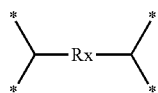
(B-9)

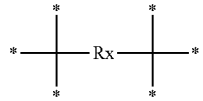
(B-10)

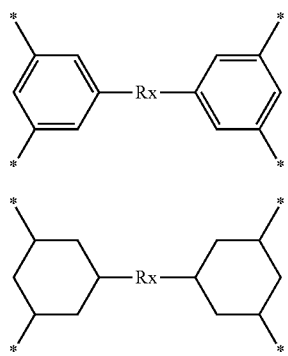

in the formulae, Rx represents a divalent substituent including an oxygen atom, a nitrogen atom, a sulfur atom, or a phosphorus atom, and * represents a bonding site in the multibranched polymer.

6. The solid electrolyte composition according to claim 1, wherein the core portion is a group of atoms having a molecular weight of 200 or more.

7. The solid electrolyte composition according to claim 5, wherein the core portion has a partial structure represented by any of the following formulae,

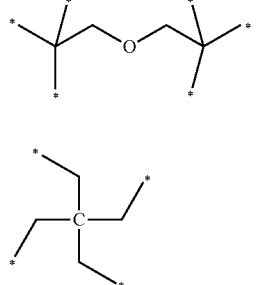

-continued

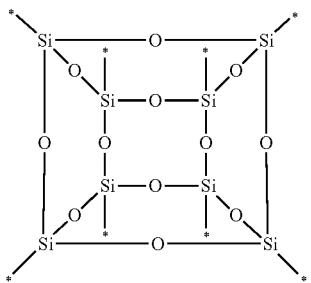

(B-16)

in the formulae, * represents a bonding site in the multibranched polymer.

8. The solid electrolyte composition according to claim 1, wherein a content of the salt of the metal belonging to Group I or II of the periodic table is 5% by mass to 60% by mass with respect to a total of 100% by mass of the multibranched polymer and the salt of the metal belonging to Group I or II of the periodic table.

9. The solid electrolyte composition according to claim 1, wherein the salt of the metal belonging to Group I or II of the periodic table is lithium bis(trifluoromethanesulfonyl)imide, lithium bis(fluorosulfonyl)imide and/or lithium bisoxalatoborate.

10. The solid electrolyte composition according to claim 1, further comprising:
an active material capable of intercalating and deintercalating an ion of a metal belonging to Group I or II of the periodic table.

11. The solid electrolyte composition according to claim 1,
wherein a content of the multibranched polymer is 0.1 parts by mass or more and 10 parts by mass or less with respect to 100 parts by mass of the sulfide-based inorganic solid electrolyte having a conductivity of an ion of a metal belonging to Group I or II of the periodic table.

12. A sheet for an all-solid state secondary battery comprising:
a layer of the solid electrolyte composition according to claim 1 on a base material.

13. An all-solid state secondary battery comprising:
a positive electrode active material layer;
a negative electrode active material layer; and
an inorganic solid electrolyte layer,
wherein at least one layer of the positive electrode active material layer, the negative electrode active material layer, or the inorganic solid electrolyte layer is a layer of the solid electrolyte composition according to claim 1.

14. A method for manufacturing a sheet for an all-solid state secondary battery, the method comprising: a step of applying the solid electrolyte composition according to claim 1 onto a base material.

15. A method for manufacturing an all-solid state secondary battery, the method comprising:
a step of applying the solid electrolyte composition according to claim 1 onto a base material.

* * * * *